United States Patent
Okamura et al.

(10) Patent No.: US 6,862,527 B2
(45) Date of Patent: Mar. 1, 2005

(54) VEHICLE SURROUNDINGS MONITORING APPARATUS

(75) Inventors: Shigekazu Okamura, Tokyo (JP); Minoru Nishida, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/629,707

(22) Filed: Jul. 30, 2003

(65) Prior Publication Data

US 2004/0024498 A1 Feb. 5, 2004

Related U.S. Application Data

(62) Division of application No. 09/870,795, filed on Jun. 1, 2001, now Pat. No. 6,631,324.

(30) Foreign Application Priority Data

Nov. 29, 2000 (JP) ........................................ 2000-363014

(51) Int. Cl.[7] .......................... G06F 17/00; G01S 17/10
(52) U.S. Cl. ......................... 701/301; 701/300; 342/70; 340/435
(58) Field of Search ................................ 340/901–903, 340/905, 435–437; 356/4.01, 4.07, 3.09; 701/300–301, 1, 36, 93, 96; 180/167–170; 342/27–28, 70–73, 113–118, 42, 46, 61, 82, 89

(56) References Cited

U.S. PATENT DOCUMENTS

| | | | |
|---|---|---|---|
| 5,467,283 A | * 11/1995 | Butsuen et al. | ............. 701/301 |
| 5,600,561 A | 2/1997 | Okamura | ..................... 701/300 |
| 5,635,844 A | 6/1997 | Takigawa et al. | ........... 324/642 |
| 5,689,264 A | * 11/1997 | Ishikawa et al. | ............... 342/70 |
| 5,745,870 A | * 4/1998 | Yamamoto et al. | ......... 701/301 |
| 5,754,099 A | * 5/1998 | Nishimura et al. | ......... 340/435 |
| 5,798,727 A | * 8/1998 | Shirai et al. | ................... 342/70 |
| 5,832,407 A | 11/1998 | Kai et al. | ..................... 701/205 |
| 6,018,308 A | 1/2000 | Shirai | .......................... 342/70 |
| 6,122,040 A | 9/2000 | Arita et al. | ................. 356/4.01 |
| 6,243,024 B1 | * 6/2001 | Yamabuchi et al. | ........ 340/903 |
| 6,553,283 B2 | * 4/2003 | Shirai et al. | .................... 701/1 |
| 6,583,752 B2 | * 6/2003 | Samukawa et al. | ............ 342/70 |
| 6,590,521 B1 | * 7/2003 | Saka et al. | ..................... 342/70 |

FOREIGN PATENT DOCUMENTS

| | | |
|---|---|---|
| JP | 5-180993 | 3/1994 |
| JP | 7-318652 | 11/1996 |
| JP | 2000-180540 | 6/2000 |

* cited by examiner

Primary Examiner—Jacques H. Louis-Jacques
(74) Attorney, Agent, or Firm—Sughrue Mion, PLLC

(57) ABSTRACT

A laser radar scanningly irradiates electromagnetic waves around a subject vehicle detects the electromagnetic waves reflected from objects around the subject vehicle, and outputs detected distances from the subject vehicle to the objects in the respective directions of scanning irradiation. A recognition unit detects, based on the detection results of the laser radar, a relative position and a relative speed of each of the objects around the subject vehicle with respect to the subject vehicle. The recognition unit stores whether or not detection points data (i.e., a direction of scanning irradiation and a detected distance in that direction) exists and determines attributes such as positions, sizes, etc., of the objects lying around the subject vehicle. In coordination with the recognition unit, an object tracker calculates relative speeds as between the vehicle and detected objects, with particular reference to objects exhibiting a greater difference in relative speed over time.

4 Claims, 16 Drawing Sheets ns Monitoring Apparatus

VEHICLE SURROUNDINGS MONITORING APPARATUS

This application is based on Application No. 2000-363014, filed in Japan on Nov. 11, 2000, the contents of which are hereby incorporated by reference. This application is also a divisional of parent application Ser. No. 09/870,795 filed Jun. 1, 2001, now U.S. Pat. No. 6,631,324; the disclosure of which is incorporated herein by reference.

BACKGROUND OF THE INVENTION

1. Field of the Invention

The present invention relates to a vehicle surroundings monitoring apparatus which is capable of detecting objects such as vehicles lying in the surroundings of a vehicle of concern, and which is usable with such a device as an intervehicle (vehicle to vehicle) distance warning device, an intervehicle distance control device, a backside warning device or the like, for generating a warning or controlling the vehicle of concern based on the distance of the vehicle of concern to other vehicles lying around the vehicle of concern. More specifically, the present invention relates to such a vehicle surroundings monitoring apparatus which can exhibit the utmost effect particularly in the case of using an optical radar or a laser radar with high sensitivity and a wide horizontal viewing angle.

2. Description of the Related Art

In the past, for a preventive safety device for a vehicle, there has been proposed an intervehicle distance warning apparatus which is mounted on a vehicle of concern (hereinafter simply referred to as a subject vehicle) for measuring the distances from the subject vehicle to other vehicles, particularly to a vehicle running ahead thereof (hereinafter simply referred to as an intervehicle distance) and generate a warning to the operator of the subject vehicle when the intervehicle distance becomes dangerous, i.e., below a prescribed distance. Also, there has been proposed an intervehicle distance control apparatus which adjusts the running speed of a subject vehicle in an automatic manner so as to prevent the intervehicle distance to a vehicle running ahead thereof from becoming shorter than a prescribed value. In these apparatuses, a vehicle surroundings monitoring apparatus using a scanning type laser radar has often been employed for measuring the intervehicle distance and the relative speed of the subject vehicle to the speed of a preceding vehicle running ahead thereof, which is the rate of change of the intervehicle distance.

The scanning type laser radar scanningly irradiates a transmission wave or laser beam over a prescribed angle around the subject vehicle, detects the returned wave or beam reflected by surrounding objects, and measures the distance from the subject vehicle to each object in each radiation direction based on a time span between a transmission time point, at which the transmission wave or beam was irradiated, and a detection time point, at which the reflected wave or beam was received. Therefore, in order to detect surrounding objects, it is necessary to calculate the relative positions and the relative speeds of these objects with respect to the subject vehicle after the objects such as vehicles and obstacles are reconstructed in a measurement space on the basis of the distance data measured in the respective radiation directions. Such a kind of conventional apparatuses are described, for example, in Japanese Patent Application Laid-Open No. 5-180933 and Japanese Patent Application Laid-Open No. 7-318652.

With the apparatus described in the Japanese Patent Application Laid-Open No. 5-180933, an obstacle is first recognized as a set of blocks each of which has a predetermined area based on the detection results of the reflected wave, and the position of the center of gravity thereof is then detected. Subsequently, the position at which the center of gravity of the obstacle is expected to be detected at the next scanning is estimated, and when the center of gravity of the obstacle recognized as the set of blocks is actually detected at the estimated position at the next scanning, it is determined that both of the obstacles actually detected and estimated are the same object. Thereafter, the relative speed of the vehicle to the obstacle is calculated from the rate or amount of change and the difference in time of the positional data of the center of gravity of the obstacles which have been determined to be the same object.

However, since in such a kind of apparatus, an obstacle is recognized as a set of blocks each having a prescribed area, a large amount of information is required to define one obstacle, thus complicating the processing of data. Therefore, the load of a processing device such as a computer has increased. Moreover, since roadside objects such as guardrails are recognized as obstacles, the load of the processing device has further increased in the case where these roadside object exist. Therefore, with these apparatuses, it has been impossible to improve the processing speed and accuracy in the obstacle recognition to any satisfactory extent.

In view of these circumstances, the Japanese Patent Application Laid-Open No. 7-318652 proposes to achieve the detection of surrounding objects according to the following procedure.

1) An obstacle around a subject vehicle is recognized as points.
2) Adjoining ones of the recognized points are combined or integrated with each other into sets of points.
3) Among the integrated sets of points, those sets each of which has a longitudinal length less than a prescribed value in the longitudinal direction of the subject vehicle are recognized as line segments each having a length only in the widthwise direction of the subject vehicle.
4) That position of each of the line segments recognized at a past scanning which is to be expected at the current scanning is estimated, and if the line segment currently recognized is located at the estimated position, it is determined that the past recognized line segment is the same as the current recognized line segment.
5) The relative speed between the subject vehicle and the obstacle is calculated from the positional data of the line segments which are determined to be the same one.

In this manner, the amount of information necessary to define one obstacle is reduced so as to prevent roadside objects such as guardrails from being recognized as obstacles.

However, the conventional apparatuses as described above are based on the following specifications as their premise.

a) A horizontal viewing angle is set to about 16 degrees in order to detect vehicles or obstacles present on a lane on which the subject vehicle is running.
b) Major objects to be detected are highly reflective elements such as reflectors mounted on the rear end of a vehicle, delineators installed on the shoulders of a road, or the like.

Therefore, in the case where a scanning type laser radar is used which is so sensitive as to be able to detect the body of a vehicle and has so wide a horizontal viewing angle as to able to detect vehicles running on lanes adjacent the lane on which the subject vehicle is running in order to improve the detection rate or efficiency or detect an interrupting vehicle, there will arise the following problems with the conventional apparatus, for example, as set forth in the Japanese Patent Application Laid-Open No. 7-318652, thus making such an application difficult.

A) Since the method for determining that the line segment recognized at a past scanning is the same as the line segment recognized at the current scanning is complicated, the number of line segments to be detected increases as the sensitivity and the horizontal viewing angle increase, so the number of combinations of the line segments for determining the same line segment increases accordingly, thereby requiring quite a lot of processing time. That is, the increasing number of detected line segments makes it difficult to perform the recognition processing at a prescribed period or interval.

B) Also, in actually constructing such an apparatus, it is necessary to estimate the maximum amount of processing at the time when the number of segments is increased, in order to determine the capacity of processing required of the apparatus, but with the conventional apparatus, all the possible combinations of line segments must be conceived and examined, and hence it becomes extremely difficult to estimate the maximum amount of processing. Therefore, it is impossible to ensure that the recognition processing can be done at the prescribed cycle under all situations.

SUMMARY OF THE INVENTION

The present invention is intended to obviate the above-described problems in the prior art and propose a novel and improved method for detecting and/or tracking an object or objects with a substantially constant amount of processing even if the number of detection points data increases while limiting the maximum processing time.

The object of the present invention is to provide a vehicle surroundings monitoring apparatus using in particular a scanning type laser radar with a high sensitivity and a wide horizontal viewing angle, or using a radio wave radar with a wide viewing angle and a high angular resolution which will be put into practical use in the future.

Bearing the above object in mind, a vehicle surroundings monitoring apparatus according to a first aspect of the present invention includes: a radar for scanningly irradiating electromagnetic waves over a predetermined angular range around a subject vehicle on which the apparatus is mounted, detecting the electromagnetic waves reflected from objects lying around the subject vehicle, and outputting a plurality of directions of scanning irradiation and detected distances from the subject vehicle to the objects in the respective directions of scanning irradiation; and a recognition unit for outputting, based on the detection results of the radar, a relative position and a relative speed, or a rate of change of the relative position, of each of the objects lying around the subject vehicle with respect to the subject vehicle. The recognition unit comprises: a detection points data storage section for storing therein whether or not detection points data in the form of a data pair comprising a direction of scanning irradiation and a detected distance in that direction output by the radar exists in each of M×N small regions into which X, Y coordinates with an X axis being set in a widthwise direction of the subject vehicle and a Y axis being set in a running direction of the subject vehicle are divided, in a two-dimensional array including a plurality of elements corresponding to the small regions, respectively; and an object detection section for performing arithmetic operations of multiplication and summation of the respective elements of the two-dimensional array representative of the presence or absence of the detection points data stored in the detection points data storage section while sequentially scanning a mask of a two-dimensional array comprising J×K (J<N, K<M) elements, and determining, based on the results of the arithmetic operations, attributes such as positions, sizes, etc., of the objects lying around the subject vehicle.

In a preferred form of the first aspect of the present invention, the detection points data storage section comprises: a stop detection points determiner for determining, by the use of information about the subject vehicle, whether each of the detection points data is a piece of stop detection points data representative of the data of a stop or stationary object detected, or a piece of moving points detection data representative of an object other than the stationary object, i.e., a moving object; a stop detection points data storage section for storing, based on the results of determination of the stop detection points determiner, the presence or absence of stop detection points data in each of M×N small regions into which X, Y coordinates with an X axis being set in a widthwise direction of the subject vehicle and a Y axis being set in a running direction of the subject vehicle are divided, in a two-dimensional array comprising a plurality of elements corresponding to the small regions, respectively; and a moving detection points data storage section for storing, based on the results of determination of the stop detection points determiner, the presence or absence of moving detection points data in each of the M×N small regions into which X, Y coordinates with an X axis being set in a widthwise direction of the subject vehicle and a Y axis being set in a running direction of the subject vehicle are divided, in a two-dimensional array comprising a plurality of elements corresponding to the small regions, respectively. The object detection section comprises: a stationary object detector for performing arithmetic operations of multiplication and summation of the respective elements of the two-dimensional array representative of the presence or absence of the stop detection points data stored in the stop detection points data storage section while sequentially scanning a mask of a two-dimensional array comprising J×K (J<N, K<M) elements, and determining, based on the results of the arithmetic operations, attributes such as positions, sizes, etc., of stationary objects lying around the subject vehicle; and a moving object detector for performing arithmetic operations of multiplication and summation of the respective elements of the two-dimensional array representative of the presence or absence of the moving detection points data stored in the moving detection points data storage section while sequentially scanning a mask of a two-dimensional array comprising J×K (J<N, K<M) elements, and determining, based on the results of the arithmetic operations, attributes such as positions, sizes, etc., of moving objects lying around the subject vehicle.

In another preferred form of the first aspect of the present invention, the recognition section further comprises a column detection points determiner for determining whether the respective detection points data are column detection points data representative of data arranged in the running direction of the subject vehicle, and the detection points data storage section does not use the column detection points data in its processing.

In a further preferred form of the first aspect of the present invention, the recognition section further comprises a column detection points determiner for determining whether the respective detection points data are column detection points data representative of data arranged in the running direction of the subject vehicle, and the stop detection points data storage section or the moving detection points data storage section does not use the column detection points data in their processing.

In a yet further preferred form of the first aspect of the present invention, the recognition unit further comprises a curved road detection points determiner for determining whether the respective detection points data are curved road detection points data representative of data arranged along a curved road, and the detection points data storage section does not use the curved road detection points data in its processing.

In a still further preferred form of the first aspect of the present invention, the recognition unit further comprises a curved road detection points determiner for determining whether the respective detection points data are curved road detection points data representative of data arranged along a curved road, and the stop detection points data storage section or the moving detection points data storage section does not use the curved road detection points data in their processing.

A vehicle surroundings monitoring apparatus according to a second aspect of the present invention comprises: a radar for scanningly irradiating electromagnetic waves over a predetermined angular range around a subject vehicle on which the apparatus is mounted, detecting the electromagnetic waves reflected from objects lying around the subject vehicle, and outputting detected distances from the subject vehicle to the objects lying around the subject vehicle and directions of the objects from the subject vehicle; and a recognition unit for outputting, based on the detection results of the radar, a relative position and a relative speed, or a rate of change of the relative position, of each of the objects lying around the subject vehicle with respect to the subject vehicle. The recognition unit comprises: an object detection section for detecting positions of the objects by using detection points data obtained by the radar, and calculating object positional data representative of the positional data of the objects; an object position estimator for estimating a position of each object detected in the past which should currently be detected, based on the past positional data of that object; a window setter for setting a prescribed window in such a manner as to surround the estimated position of each object output by the object position estimator; and an object tracker for determining the current positional data of an object by using the detection points data contained in the window set by the window setter, and calculating a relative speed of that object to the subject vehicle by using the positional data of that object detected in the past.

In a preferred form of the second aspect of the present invention, the recognition unit further comprises a stop detection points determiner for determining, by the use of information about the subject vehicle, whether each of the detection points data is a piece of stop detection points data representative of the data of a stopped object detected, or a piece of moving points detection data representative of an object other than a stopped object, and the object tracker calculates, based on the determination results of the stop detection points determiner, a current positional data of an object, by using the stop detection points data contained in the window set by the window setter when a difference between a relative speed of that object with respect to the subject vehicle detected in the past and a speed of the subject vehicle detected in the past is less than a prescribed value, but by using the moving detection points data contained in the set window when a difference between a relative speed of that object with respect to the subject vehicle and a speed of the subject vehicle both detected in the past is equal to or greater than the prescribed value, and the object tracker also calculates a current relative speed of that object with respect to the subject vehicle by using the current and past positional data of that object.

In another preferred form of the second aspect of the present invention, the object detection section does not use the detection points data which were used to calculate the object positional data in the current processing of the object tracker.

In a further preferred form of the second aspect of the present invention, the recognition section further comprises a column detection points determiner for determining whether the respective detection points data are column detection points data representative of data arranged in the running direction of the subject vehicle, and the object tracker does not use the column detection points data in its processing based on the detection results of the column detection points determiner.

In a yet further preferred form of the second aspect of the present invention, the recognition unit further comprises a curved road detection points determiner for determining whether the respective detection points data are curved road detection points data representative of data arranged along a curved road, and the object tracker does not use the curved road detection points data in its processing based on the detection results of the curved road detection points determiner.

The above and other objects, features and advantages of the present invention will become more readily apparent to those skilled in the art from the following detailed description of a preferred embodiment of the present invention taken in conjunction with the accompanying drawings.

DESCRIPTION OF THE PREFERRED EMBODIMENT

In the following, a preferred embodiment of the present invention will be described in detail while referring to the accompanying drawings.

Embodiment 1.

Figure 1:
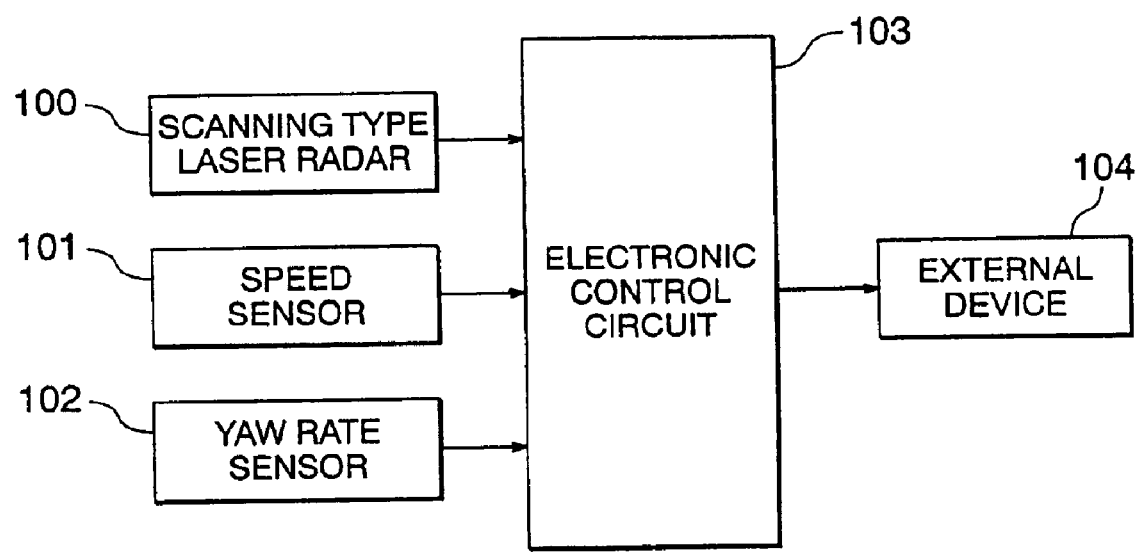
FIG. 1 is a block diagram showing the construction of a vehicle surroundings monitoring apparatus according to one embodiment of the present invention.

FIG. 1 illustrates, in a block diagram, the construction of a vehicle surroundings monitoring apparatus constructed in accordance with one embodiment of the present invention. In FIG. 1, the vehicle surroundings monitoring apparatus of the present invention includes a radar in the form of a scanning type laser radar 100, a speed sensor 101 for measuring the running speed of a subject vehicle such a motor car on which the apparatus is installed, a yaw rate sensor 102 for measuring the yaw rate of the subject vehicle and an electronic control unit 103 in the form of a recognition unit such as a microcomputer provided with an arithmetic operation device or processor, a data storage element, and so on.

Figure 11:
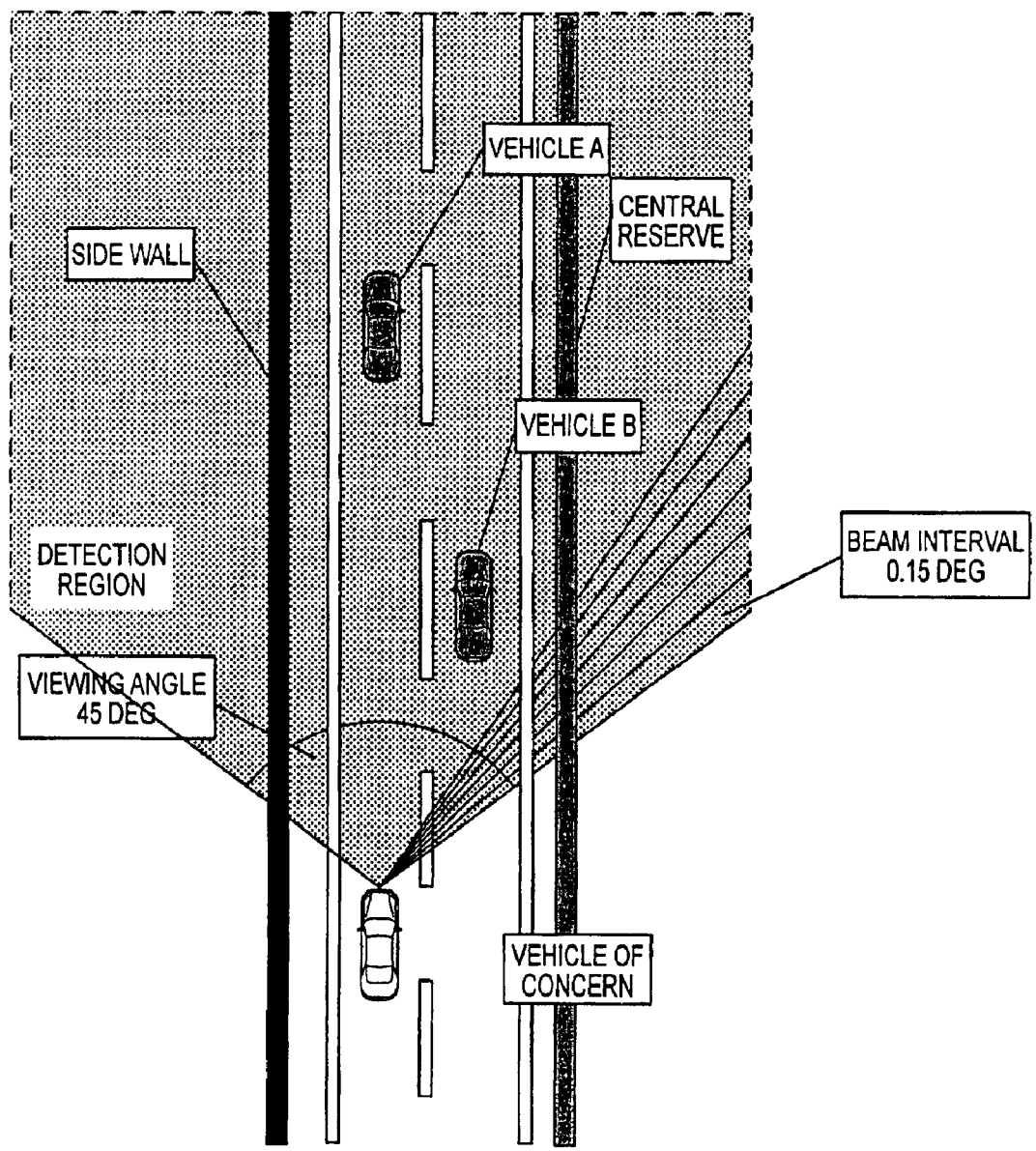
FIG. 11 is a view for explaining a scanning type laser radar used in the present invention.

The laser radar 100 irradiates a laser beam while scanning at intervals of 0.15 degrees over an angular range of 45 degrees ahead of the subject vehicle, as illustrated in FIG. 11, detects the laser beam reflected by surrounding objects, and measures the distances from the subject vehicle to the surrounding objects lying in the direction of each irradiation at a time span or difference between the time points of irradiation and detection or reception of the laser beam. In addition, the laser radar 100 adopts an avalanche photodiode as a photodetector, and hence can detect not only a reflex reflector installed on the rear end of the body of a preceding vehicle, but also the vehicle body itself and roadside objects such as side walls, etc. The direction of irradiation and the distance data as the result of measurements by the laser radar 100 are output to the electronic control unit 103 by way of CAN communications.

The electronic control unit 103 constitutes the recognition unit for calculating, based on the detection results of the laser radar 100, the relative position and the rate of change thereof, i.e., the relative speed, of each of objects, lying in the surroundings of the subject vehicle, with respect to the subject vehicle. Also, the electronic control unit 103 outputs to an external device 104 such as, for example, an intervehicle distance warning device the results of calculations such as the relative position, the relative speed, etc., of a preceding vehicle lying ahead of the subject vehicle.

Figure 2:
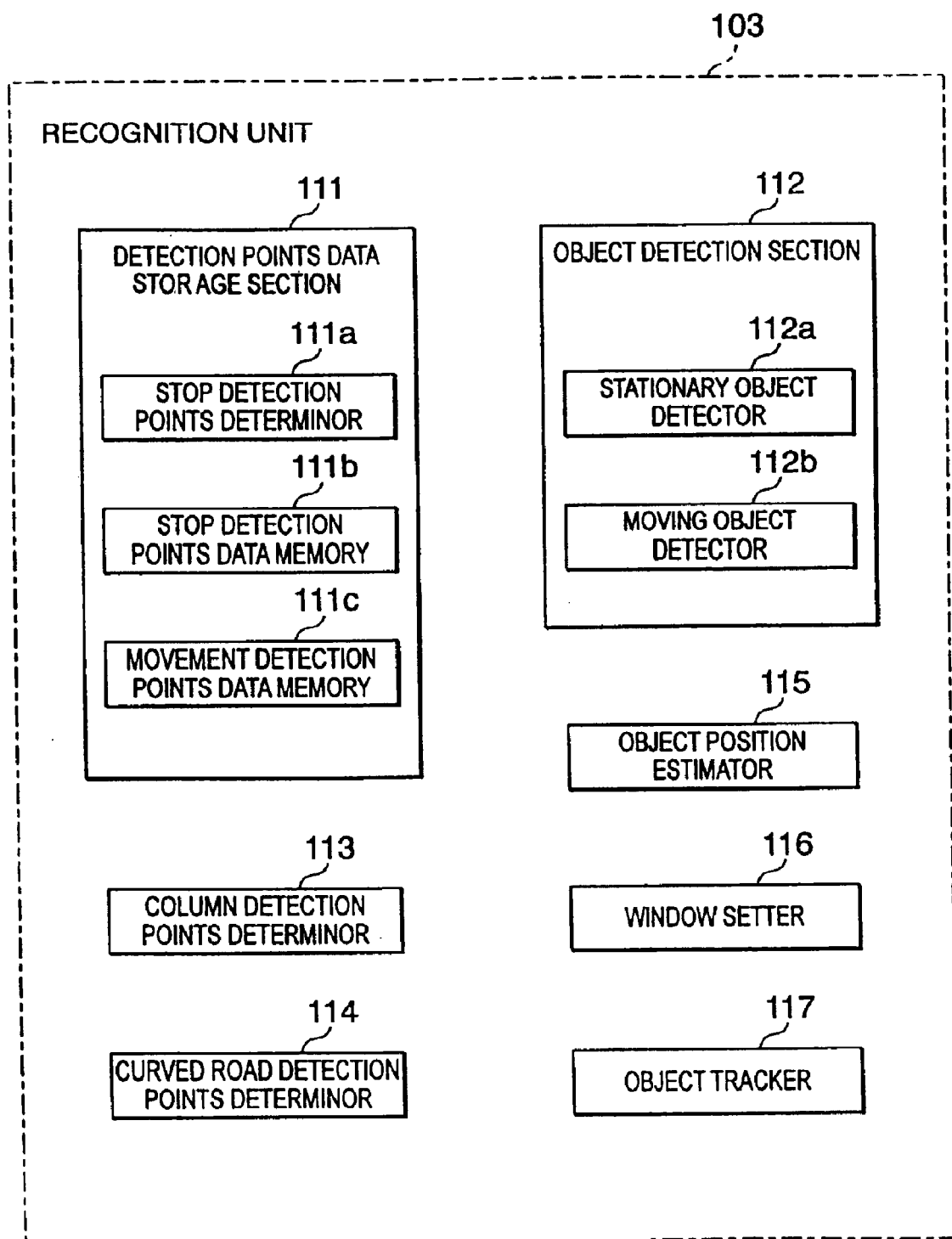
FIG. 2 is a block diagram showing the functional construction of an electronic control unit (recognition unit) of the present invention.

FIG. 2 illustrates, in a block diagram, the functional construction of the electronic control unit or the recognition unit 103. As shown in this figure, the recognition unit 103 includes a detection points data storage section 111, an object detection section 112, a column or longitudinal detection points determiner 113, a curved road detection points determiner 114, an object position estimator 115, a window setter 116, and an object tracker 117, all of these elements being described in detail below.

The detection points data storage section 111 stores therein whether or not detection points data in the form of a data pair comprising the direction of each scanning irradiation and the detected distance in that direction output by the radar exists in each of M×N small areas or regions into which X, Y coordinates with the X axis being set in the widthwise direction of the subject vehicle and the Y axis being set in the running or longitudinal direction of the subject vehicle are divided, in a two-dimensional array including a plurality of elements corresponding to the small regions, respectively. The detection points data storage section 111 includes a stop detection points determiner 111a for determining, by the use of information about the subject vehicle, whether each piece of detection points data is stop detection points data representative of the data of a stopped or stationary object detected, or moving detection points data representative of an object other than the stopped or stationary object, i.e., a moving object; a stop detection points data memory or storage section 111b for storing, based on the results of determination of the stop detection points determiner 111a, the presence or absence of stop detection points data in each of M×N small regions into which X, Y coordinates with the X axis being set in the widthwise direction of the subject vehicle and the Y axis being set in the running or longitudinal direction of the subject vehicle are divided, in a two-dimensional array comprising a plurality of elements corresponding to the small regions, respectively; and a moving detection points data memory or storage section 111c for storing, based on the results of determination of the stop detection points determiner 111a, the presence or absence of moving detection points data in each of the M×N small regions into which X, Y coordinates with the X axis being set in the widthwise direction of the subject vehicle and the Y axis being set in the running or longitudinal direction of the subject vehicle are divided, in a two-dimensional array comprising a plurality of elements corresponding to the small regions, respectively.

The object detection section 112 performs arithmetic operations of multiplication and summation of the respective elements of the two-dimensional array representative of the presence or absence of the detection points data stored in the detection points data storage section 111 while sequentially scanning a mask of a two-dimensional array comprising J×K (J<N, K<M) elements, and determines, based on the results of the arithmetic operations, attributes such as positions, sizes, etc., of the objects lying around the subject vehicle.

Also, the object detection section 112 includes a stationary object detector 112a for performing arithmetic operations of multiplication and summation of the respective elements of the two-dimensional array representative of the presence or absence of the stop detection points data stored in the stop detection points data memory 111b while sequentially scanning a mask of a two-dimensional array comprising J×K (J<N, K<M) elements, and determining, based on the results of the arithmetic operations, attributes such as positions, sizes, etc., of the stationary objects lying around the subject vehicle, and a moving object detector 112b for performing arithmetic operations of multiplication and summation of the respective elements of the two-dimensional array representative of the presence or absence of the moving detection points data stored in the moving detection points data memory 111c while sequentially scanning a mask of a two-dimensional array comprising J×K (J<N, K<M) elements, and determining, based on the results of the arithmetic operations, attributes such as positions, sizes, etc., of the moving objects lying around the subject vehicle.

The column detection points determiner 113 determines whether the respective detection points data are the column detection points data which means the data arranged in the running direction of the subject vehicle. Based on the detection results, the detection points data storage section 111, i.e., the stop detection points data memory 111b or the moving detection points data memory 111c does not use the column detection points data in their processing.

The curved road detection points determiner 114 determines whether each piece of detection points data is curved road detection points data which means the data arranged along a curved road. Based on the detection results, the detection points data storage section 111, i.e., the stop detection points data memory 111b or the moving detection points data memory 111c does not use the curved road detection points data in their processing.

The object position estimator 115 estimates the position of each object detected in the past which is to be currently detected, based on the past positional data of that object.

The window setting section 116 sets a prescribed window in such a manner as to surround the estimated position of each object output by the object position estimator 115.

The object tracker 117 determines the current positional data of each object by using the detection points data included or contained in the window set by the window setter 116, and calculates the relative speed of the object to the subject vehicle by using the positional data of the object detected in the past. Moreover, based on the determination results of the stop detection points determiner 111a, the object tracker 117 calculates the current positional data of an object, by using the stop detection points data included or contained in the window set by the window setter 116 when the difference between the relative speed of the object with respect to the subject vehicle detected in the past and the speed of the subject vehicle detected in the past is less than a prescribed value, but by using the moving detection points data included or contained in the set window when the difference between the relative speed of the object with respect to the subject vehicle and the speed of the subject vehicle both detected in the past is equal to or greater than the prescribed value, and it also calculates the current relative speed of the object with respect to the subject vehicle by using the current and past positional data of the object.

Also, the object detection section 112 does not use the detection points data which were used to calculate the object positional data in the current processing of the object tracker 117.

In addition, the object tracker 117 does not use the column detection points data or the curved road detection points data based on the determination results of the curved road detection points determiner 114 or the column detection points determiner 113, respectively.

Here, note that the respective functions of the recognition unit 103, i.e., the functions of the detection points data storage section 111 including the stop detection points determiner 111a, the stop detection points data memory 111b and the moving detection points data memory 111c, the functions of the object detection section 112 including the stationary object detector 112a and the moving object detector 112b, the function of the column detection points determiner 113, the function of the curved road detection points determiner 114, the function of the object position estimator 115, the function of the window setter 116, and the function of the object tracker 117, are carried out by the execution of software.

Figure 3:
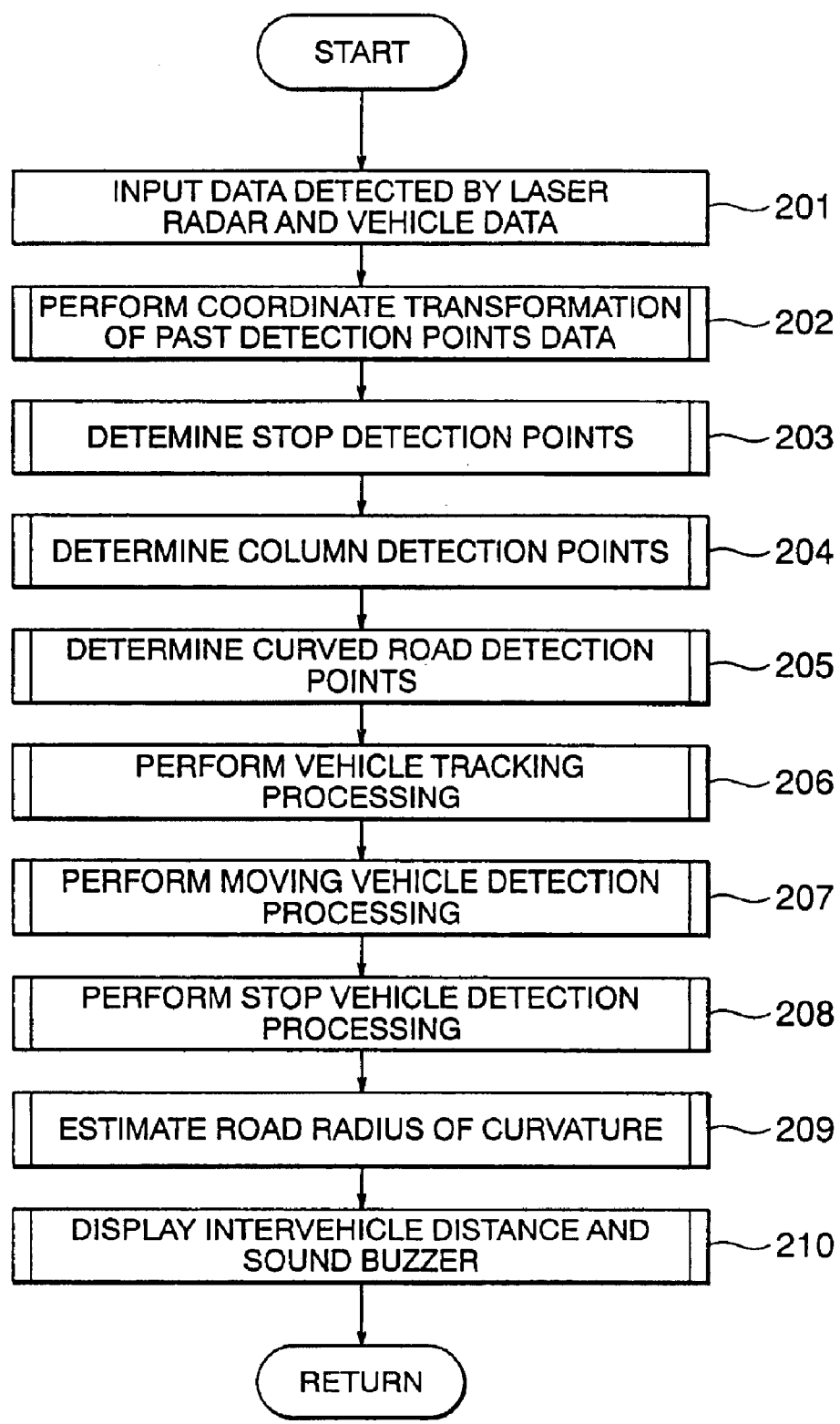
FIG. 3 is a flow chart illustrating the flow of software processing executed by the electronic control unit of the present invention.

Next, the outline of the software executed by the electronic control unit 103 will be explained below. FIG. 3 is a flow chart illustrating the flow of the entire operations in the software executed by the electronic control unit 103.

First in step 201, the detection points data measured by the scanning type laser radar 100, i.e., the diretions of irradiation and the distances detected in the respective irradiation directions, are input to the electronic control unit (recognition unit) 103 wherein the inpt date are transformed into (X, Y) data on the coordinate system (the subject vehicle coordinate system) with the widthwise direction and the running direction of the subject vehicle being set as the X axis and the Y axis, respectively. Also, the running speed and the yaw rate of the subject vehicle detected by the speed sensor 101 and the yaw rate sensor 102, respectively, are input to the recognition unit 103.

In step 202 which is a "coordinate transformation processing of the past detection points data", the detection points data detected in the past are transformed into positions on the current subject vehicle coordinate system.

In step 203 which is a "stop detection points determination processing" performed by the stop detection points determiner 111a, it is determined, for all the pieces of detection points data, whether the respective piece of detection points data are stop detection points data representative of the detection of a stopped or stationary object, or data other than stop detection points data, i.e., moving object data representative of the detection of a moving object.

In step 204 which is a "column or longitudinal detection points determination processing" performed by the column detection points determiner 113, it is determined, for all the pieces of the detection points data, whether the respective pieces of detection points data are column or longitudinally arranged detection points data representative of the data arranged in the running direction of the subject vehicle.

In step 205 which is a "curved road detection points determination processing" performed by the column detection points determiner 113, it is determined, for all the pieces of detection points data, whether the respective pieces of detection points data are curved road detection points data representative of the data arranged along a curved road (along a longitudinally sectioned curve of a road).

In step 206 which is a "vehicle tracking processing" performed by the object tracker 117, the current position of a vehicle for which tracking in the past was successful is estimated, or the current position of a vehicle detected in step 207 of a "moving vehicle detection processing" to be described in detail later or in step 208 of a "stop vehicle detection processing" to be described later is estimated, and then the current vehicle position is determined based on the data of detection points lying around the estimated vehicle position, and the relative speed of the subject vehicle is calculated.

In step 207 which is a "moving vehicle detection processing" performed by the moving detection points data memory or storage section 111c and the object detection section 112, the position of the moving vehicle newly detected at this time is calculated based on the results of the "vehicle tracking processing" in step 206 and the respective "detection points determination processings" in steps 202 through 205.

In step 208 which is a "stop vehicle detection processing" performed by the stop detection points data memory or storage section 111b and the stationary object detector 112a, the position of a stopped vehicle is determined substantially in the same manner as in the "moving vehicle detection processing" in step 207.

In step 209 which is a "road curvature estimation processing", the curvature of a road is estimated based on the vehicle speed and the yaw rate of the subject vehicle and the detected position of the moving vehicle.

In step 210 which is a "process result output processing", the position and the relative speed of the moving vehicle and the position of the stopped vehicle determined in the processings in steps 201 through 209 are output to the external device 104.

The processings of above-mentioned steps 201 through 210 are carried out repeatedly in synchronization with data input from the scanning type laser radar 100. Hereafter, the details of processings in steps 202 through 210 will be described in the order of execution.

Figure 4:
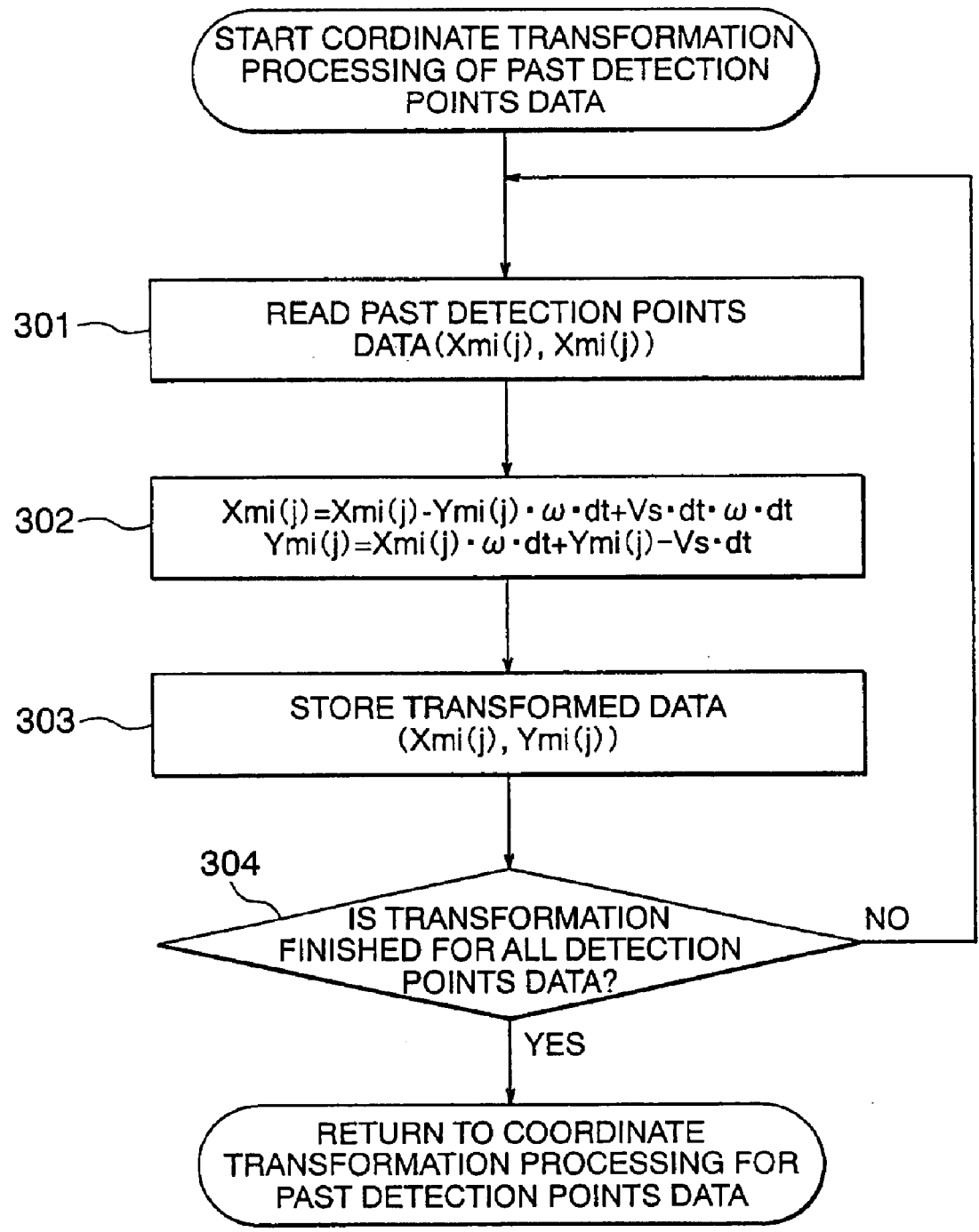
FIG. 4 is a flow chart illustrating the flow of processing in the coordinate transformation of past detection points data according to the present invention.
Figure 5:
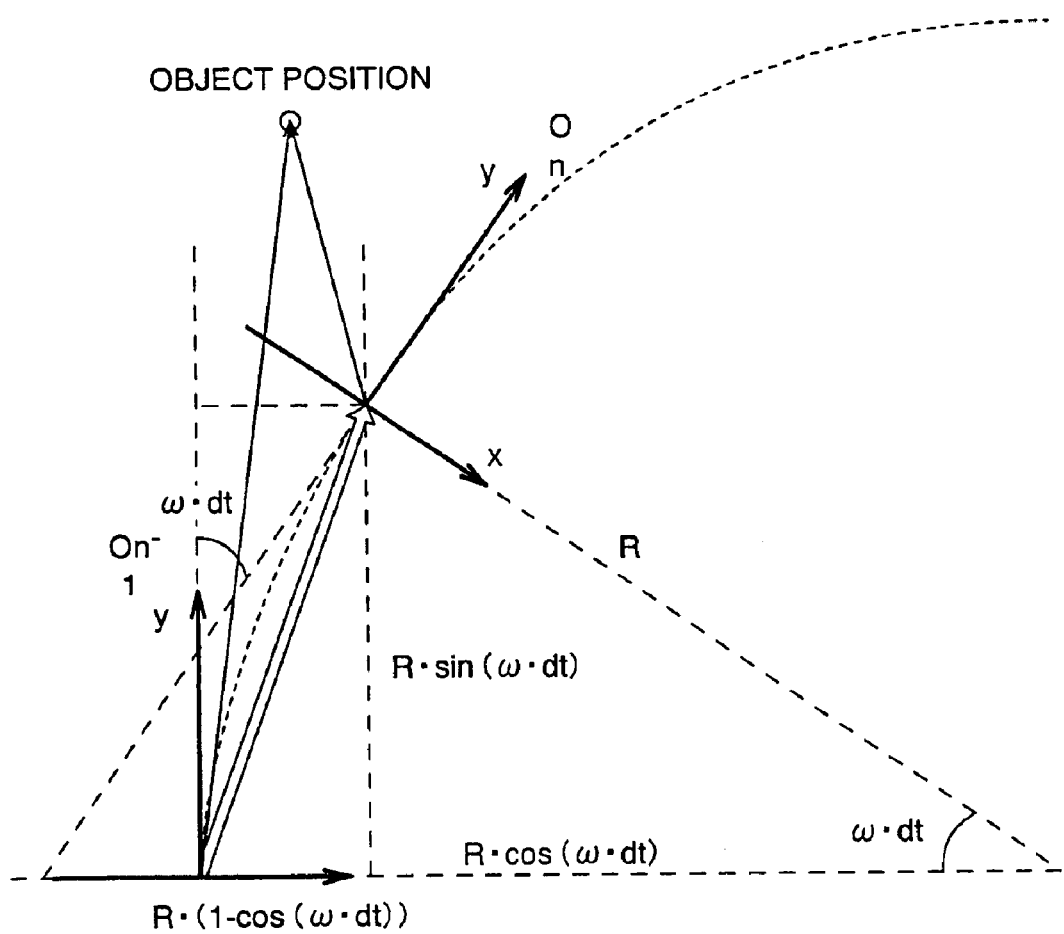
FIG. 5 is a view for explaining the coordinate transformation of detection points data according to the present invention.

First, the "coordinate transformation of past detection points data" in step 202 will be described while referring to FIG. 3. This processing is to transform the past detection points data into positions seen from the coordinate system of the subject vehicle that has moved to its current position from its previous position. FIG. 4 is a flow chart illustrating this processing. First of all, in step 301, detection points data (Xmi(j), Ymi(j)) detected in the past is read, and then in step 302, the data thus read in is transformed as indicated in the following equation (1).

$$\begin{pmatrix} Xm(j) \\ Ym(j) \end{pmatrix} = \begin{pmatrix} \cos\theta & -\sin\theta \\ \sin\theta & \cos\theta \end{pmatrix} \times \begin{pmatrix} Xm(j) - R \times (1-\cos\theta) \\ Ym(j) - R \times \sin\theta \end{pmatrix} \approx$$
$$\begin{pmatrix} Xm(j) - Ym(j) \times \omega \times dt + (Vs \times dt) \times (\omega \times dt) \\ Xm(j) \times \omega \times dt + Ym(j) - Vs \times dt \end{pmatrix} \quad (1)$$

Subsequently, in step 303, the position after the transformation is stored, and in step 304, it is determined whether transformation has been finished for all the detection points data stored, and when the answer to this question is positive ("yes"), the "coordinate transformation processing of the past detection points data" is ended The "stop detection points determination processing" in step 203 will now be described while referring to FIG. 3. In this processing, when the detection points data detected in the past are transformed into the positions seen from the coordinate system of the current position of the subject vehicle, the transformed positions are superposed on their original or non-transformed positions in the case where the detection points data detected are stop detection points data representative of a stopped object. On the other hand, in the case where the detection points data are moving object detection points data, the transformed positions are arranged along a locus of the moving object. By the use of such a principle, it is determined whether each piece of detection points data is stop detection points data or moving detection points data. That is, if many pieces of the transformed past detection points data exist in the vicinity of the detection points data detected at this time, the detection points data currently detected are determined as stop detection points data.

Figure 6:
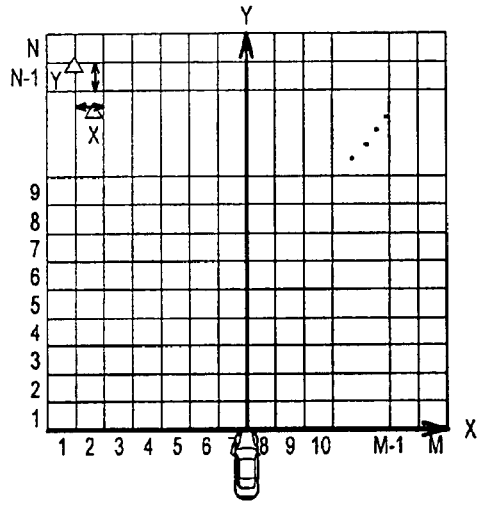
FIG. 6(a) is a view illustrating two-dimensional meshes used for a "stop detection point determination processing" of the present invention.
FIG. 6(b) is a flow chart for explaining the details of the "stop detection point determination processing" of the present invention.
Figure 6:
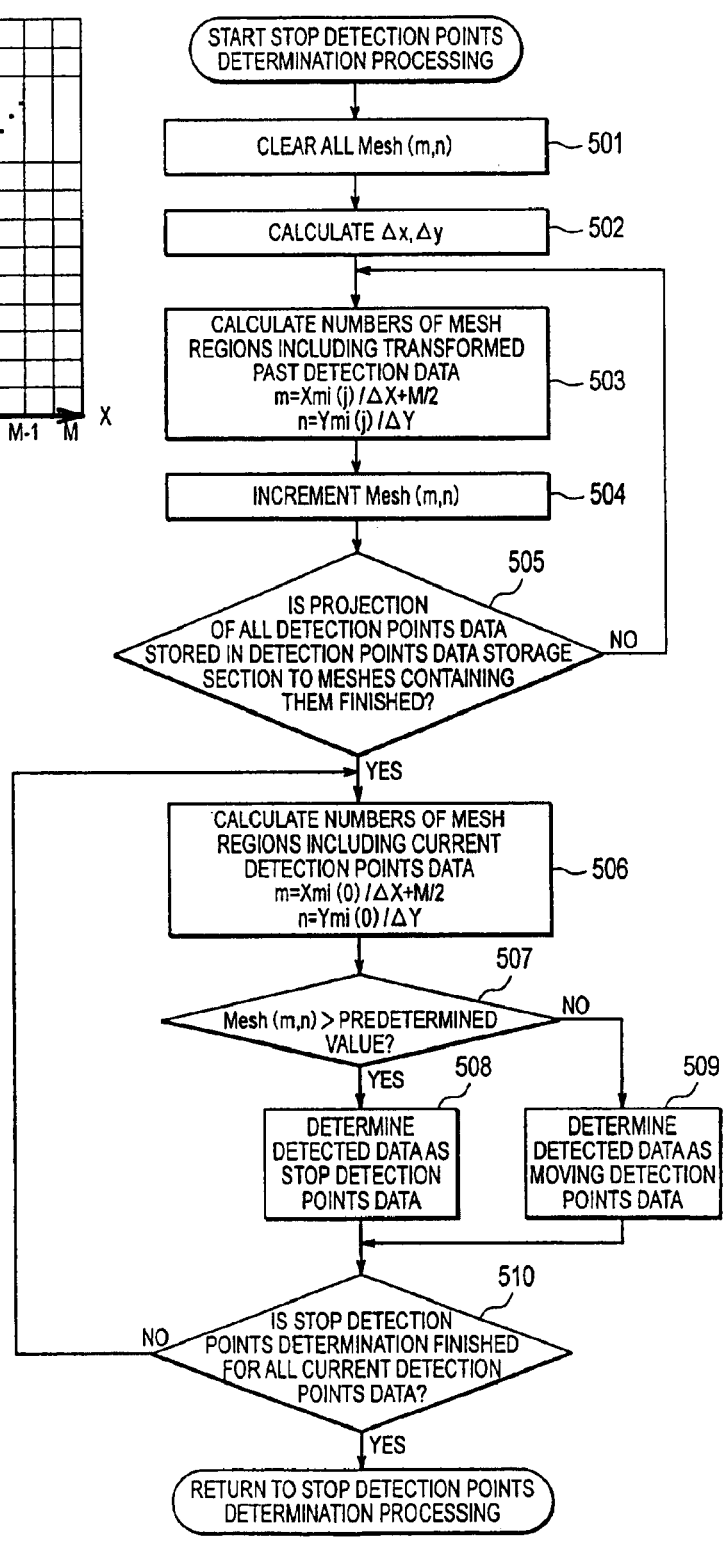

Next, the details of the "stop detection points determination processing" in step 203 will be described while referring to FIG. 6(a) and FIG. 6(b). First, all the elements of a two-dimensional array Mesh (m, n) (m=1–M, n=1–N) for storing the superpositions of the detection points are cleared to zero in step 501. This two-dimensional array Mesh (m, n) divides the coordinate system of the subject vehicle into a plurality of meshes each having a size or dimensions (ΔX, ΔY), as illustrated in FIG. 6(a), for storing the number of detection points data contained in each mesh region.

Then, in step 502, the size or dimensions (ΔX, ΔY) of each mesh is set according to the speed of the subject vehicle by the use of the following equations (2) and (3).

$$\Delta X = \Delta X0 \quad (2)$$

$$\Delta Y = (Vs \times T0)/N \quad (3)$$

(Here, note that in case of a calculated value for ΔY being less than ΔY0 (ΔY<ΔY0), ΔY is made equal to ΔY0.) where Vs is the speed of the subject vehicle (m/s), and ΔX0, ΔY0 and T0 are prescribed values, respectively. Appropriate examples for these values are as follows: ΔX0=0.25 m, ΔY0=0.5 m, T0=4.5 s.

The threshold speed of an object or a vehicle for determining stop detection points data can be arbitrarily set by changing the size or dimensions of each mesh in this manner. For instance, in the case where N is 50 and the processing cycle is 200 ms at the speed of the subject vehicle of 100 km/h, ΔY becomes 2.5 m, and hence the distance of movement of an object for a time of 200 ms, being equal to or less than 2.5 m, that is, the object with its running speed equal to or less than 45 km/h, is determined to be stop detection points data. In addition, in the case where N is 50 and the processing cycle is 200 ms at the speed of the subject vehicle of 50 km/h, ΔY becomes 1.25 m, and hence the object with its running speed equal to or less than 22.5 km/h, is determined to be stop detection points data.

In steps 503, 504, the number (m, n) of the mesh region containing past detection points data (Xmi(j), Ymi(j)) is calculated by the use of the following equations (4) and (5), and the Mesh (m, n) is incremented.

$$m = Xmi(j)/\Delta X + N/2 \quad (4)$$

$$n = Ymi(j)/\Delta Y \quad (5)$$

Subsequently, in steps 506 through 510, the number (m, n) of the mesh region containing the currently detected object positional data is calculated by the use of the equations (4), (5) above, and when the value of the Mesh (m, n) represented by thus calculated number (m, n) is equal to or greater than a prescribed value, the past detection points data contained in the mesh region of that number (m, n) is determined to be stop detection points data.

Reference will now be made to the "column detection points determination processing" of step 204 in FIG. 3. By using the fact that detection points data representative of a guardrail, a side wall and a vehicle side surface are arranged in a longitudinal direction of the subject vehicle or in a direction connecting between an object and the subject vehicle, this "column detection points determination processing" is to determine whether the respective detection points data is column or longitudinally arrayed detection points data representative of the detection of a guardrail, a side wall, and a vehicle side surface, etc.

Figure 7A:
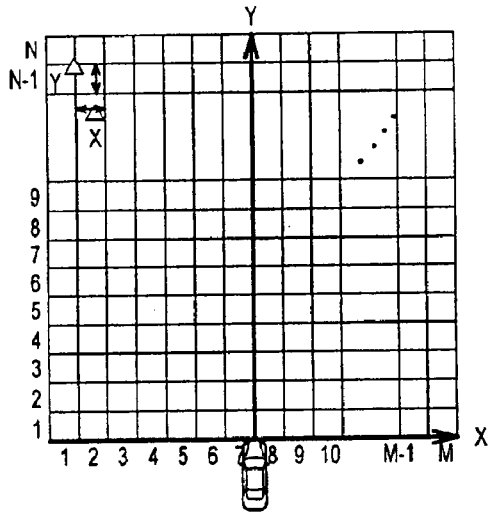
FIG. 7(a) is a view illustrating two-dimensional meshes used for a "column (longitudinal) detection points determination processing" according to the present invention.
Figure 7B:
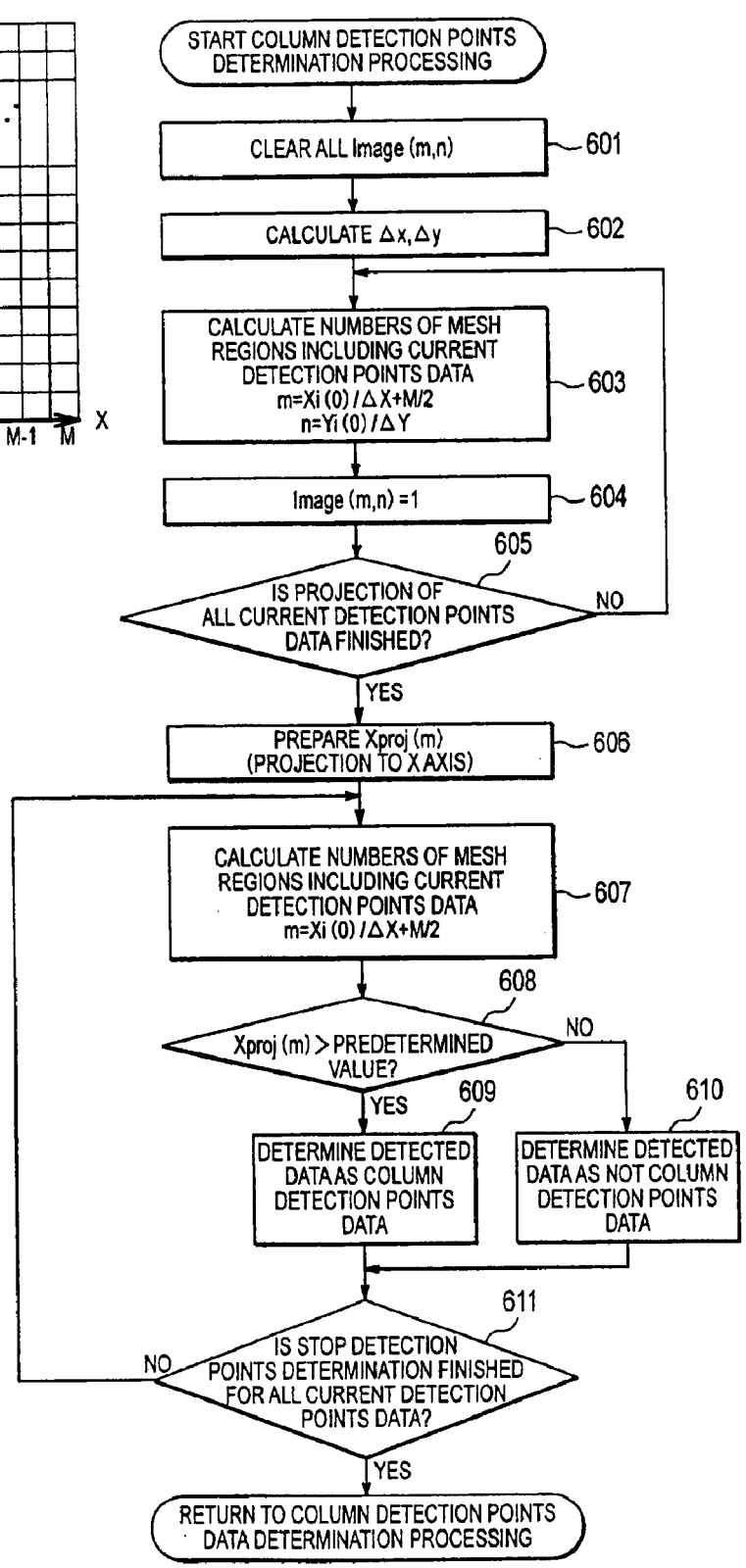
FIG. 7(b) is a flow chart for explaining the details of the "column (longitudinal) detection points determination processing" according to the present invention.

The details of the processing in the "column detection points determination" in step 204 will be described below while referring to FIG. 7(*a*) and FIG. 7(*b*). First, a two-dimensional array Image (m, n) is cleared to zero in step 601. This two-dimensional array Image (m, n) is used such that the coordinate system of the subject vehicle is divided into a plurality of meshes each having a size or area (ΔX, ΔY), as illustrated in FIG. 7(*a*), and if one of thus divided mesh regions contains at least one piece of detection points data, a value of "1" is stored for that divided region, and if not, a value of "0" is stored. In step 602, the horizontal and vertical lengths of ΔX and ΔY indicative of the mesh size are respectively set. In this embodiment, these lengths are set as follows:

ΔX=0.25 m and ΔY=2 m.

In subsequent steps 603, 604 and 605, the number (m, n) of each mesh region containing any of all the current detection points data (Xi(0), Yi(0)) is calculated according to the following equations (6) and (7), and "1" is substituted for Image (m, n).

$$m = Xi(0)/\Delta X + M/2 \quad (6)$$

$$n = Yi(0)/\Delta Y \quad (7)$$

Figure 12:
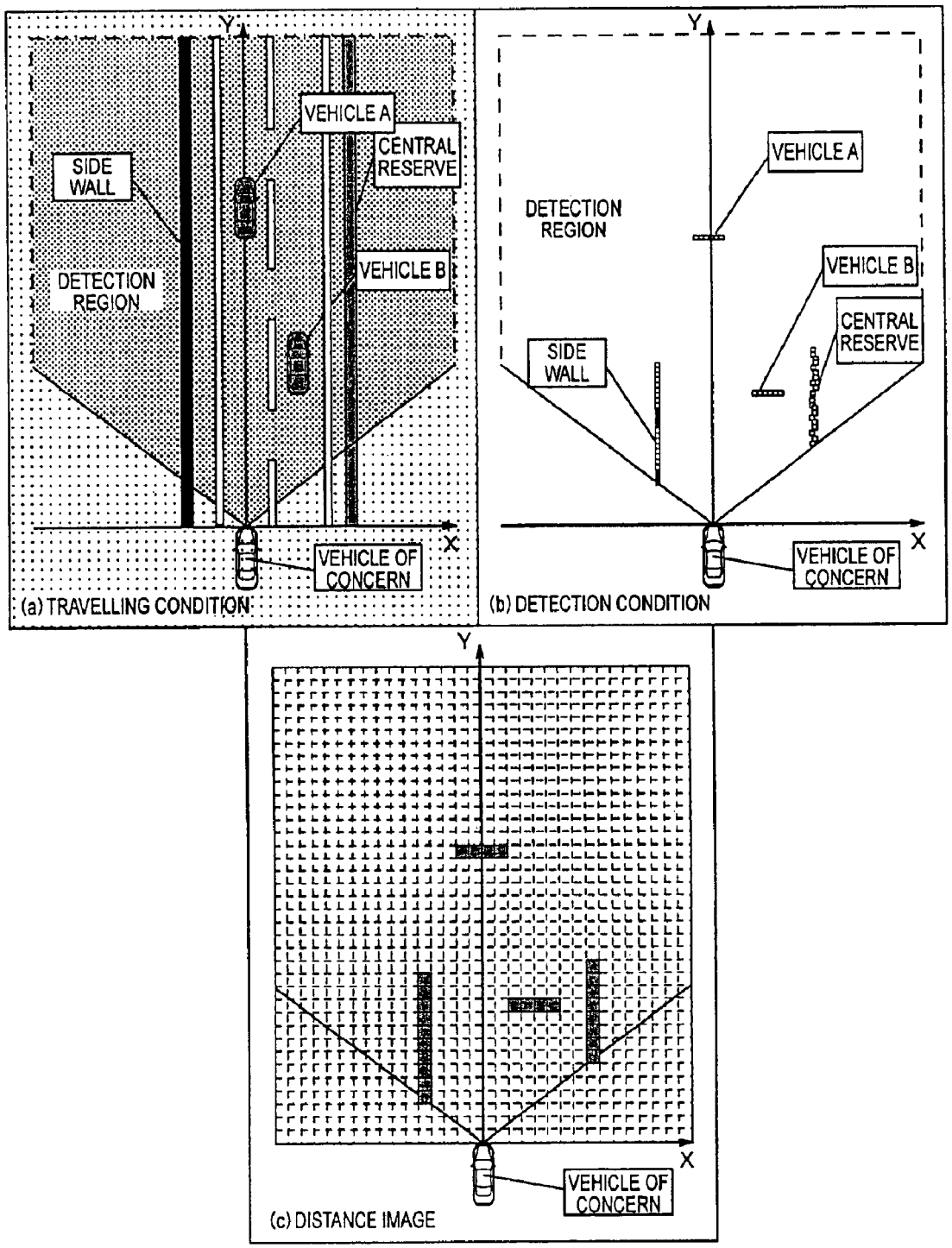
FIG. 12 is a view for explaining a distance image according to the present invention.

The two-dimensional array Image (m, n) thus obtained corresponds to a distance or range image which is obtained by developing the detection points data in the coordinate system of the subject vehicle (see FIG. 12).

Figure 13:
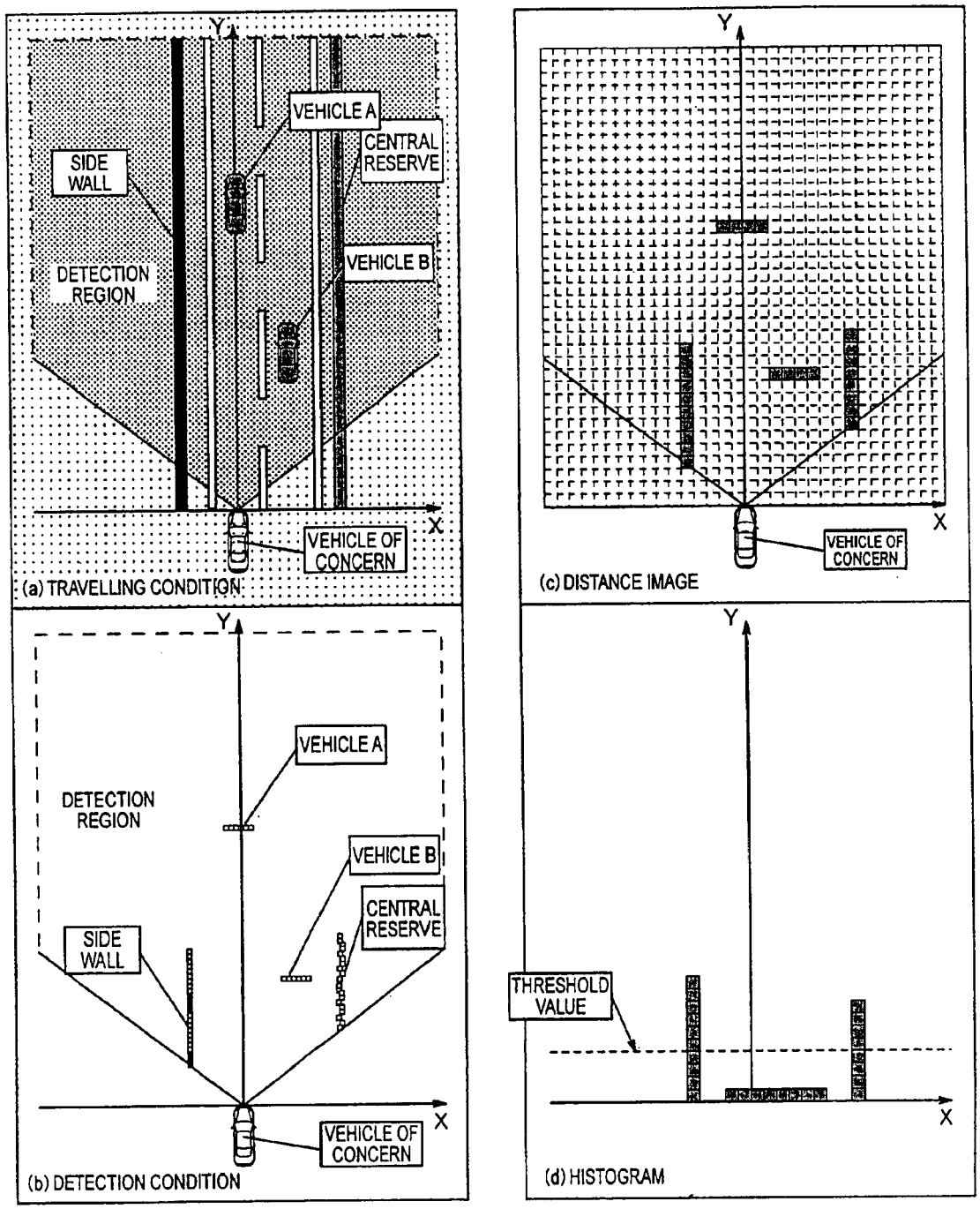
FIG. 13 is a view for explaining the preparation of a histogram in the "column (longitudinal) detection points determination processing" according to the present invention.

In step 606, the distance image obtained in steps 603 through 605 is projected to the X axis to form a histogram Xproj (m), as illustrated in FIG. 13. As the histogram is prepared in this manner, when the laser radar 100 is detecting a side wall on a straight line road for instance, the detection points data, detecting the side wall, become a group of detection points arranged in the longitudinal direction, and hence, when seeing the distance image corresponding to the group of detection points in a histogram in which the distance image is projected to the X axis, a peak comes out at a side or lateral position X in which the side wall exists. Then, in subsequent steps 607 through 611, mesh No. m containing a piece of detection points data is calculated according to equation (6) for each piece of detection points data, and if the value of Xproj (m) indicated at "m" is equal to or greater than a prescribed value, this piece of detection points data is assumed to be one of the detection points data which are arranged in the longitudinal direction, and hence it is determined as column detection points data. On the other hand, if the value of Xproj (m) is less than the prescribed value, it is determined that this piece of detection points data is not column detection points data.

Now, reference will be made to the "curved road detection points determination processing" of step 205 in FIG. 3. This processing is to determine whether the respective pieces of detection points data are curved road detection points data which have detected a guardrail or a side wall by using the fact that detection points data representative of a guardrail or a side wall are arranged along a curved road or a road curve.

Assuming that the radius of curvature of the road is denoted at R(m), and the detection points data is denoted at (Xi(0), Yi(0)) (m), and the distance to each piece of detection points data from the center of a lane on which the subject vehicle is running is denoted at Ai(m), the following equation (8) is established.

$$(X_i(0) - R)^2 + Y_i(0)^2 = (R - A_i)^2 \quad (8)$$

Solving equation (8) above for "Ai", there is obtained the following equation (9).

$$A_i = R \pm \sqrt{(X_i(0) - R)^2 + Y_i(0)^2} \quad (9)$$

Since "Ai" is the distance of an object from the lane center, a plurality of pieces of detection points data Ai obtained by detecting one guardrail, one side wall, etc., will have an equal value. Thus, using the radius of curvature (R) of the road calculated according to an "estimation processing for the radius of curvature of a road" to be described later, the respective pieces of detection points data (Xi(0), Yi(0)) will be transformed into corresponding data pairs (Ai(0), Yi(0)) according to equation (9) above, which are then developed in a coordinate system with the distance (A) from the lane center being taken as the lateral or horizontal axis and the distance Y as the vertical axis. Thereafter, the data pairs thus developed are projected to the A axis or horizontal axis to form a histogram, and the detection points data in the vicinity of a peak are determined as curved road detection points data.

Figure 8:
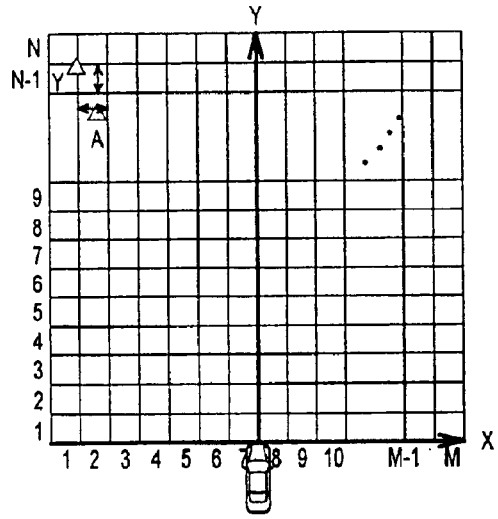
FIG. 8(a) is a view illustrating two-dimensional meshes used for a "curved road detection points determination processing" according to the present invention.
FIG. 8(b) is a flow chart for explaining the details of the "curved road detection points determination processing" according to the present invention.
Figure 8:
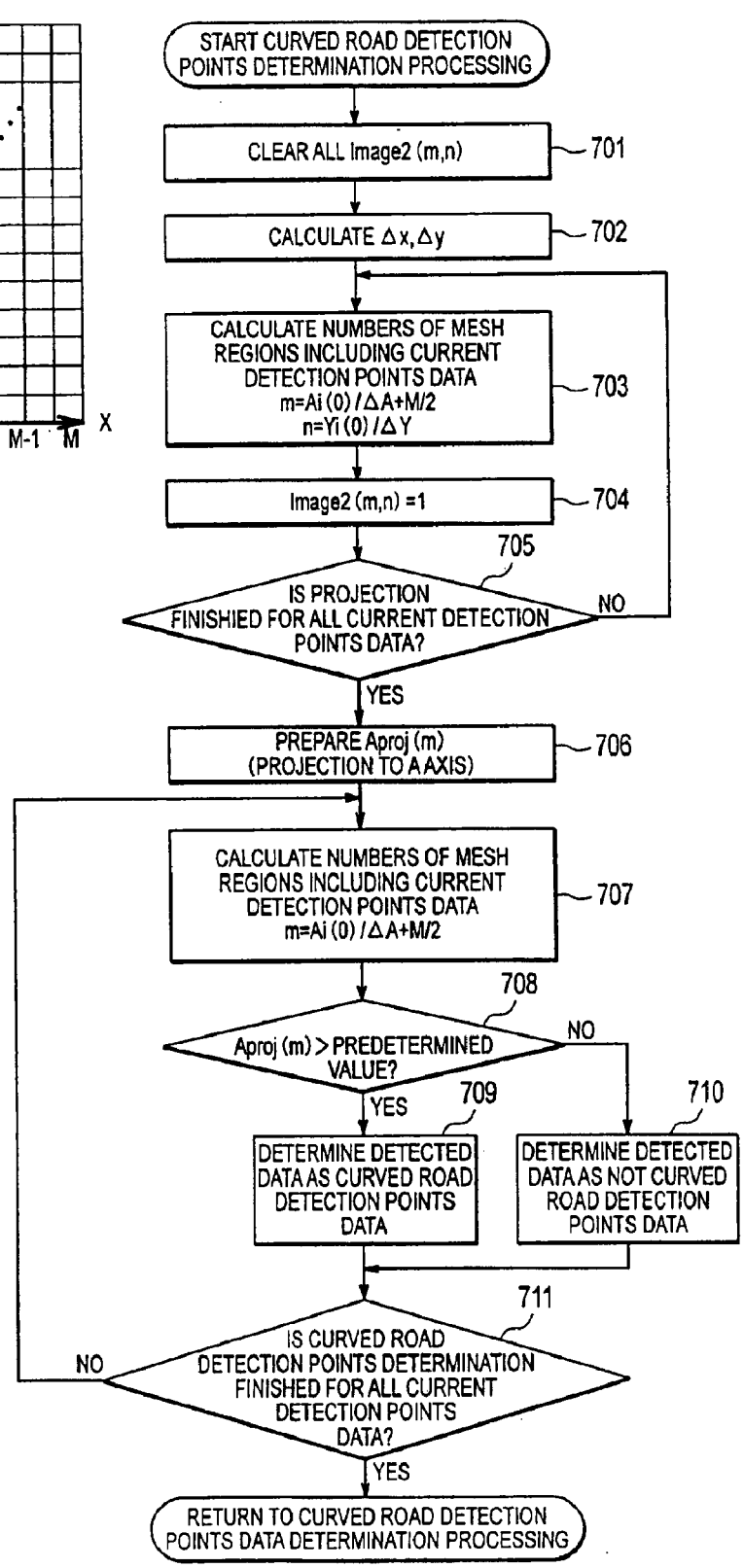

Now, reference will be made to the details of the "curved road detection points determination processing" while using FIG. 8(*a*) and FIG. 8(*b*). First, a two-dimensional array Image 2 (m, n) is cleared to zero in step 701. This two-dimensional array Image 2 (m, n) is used such that a coordinate system with the distance A from the lane center being taken as the horizontal axis (the abscissa) and the distance Y as the vertical axis (the ordinate) is divided into a plurality of meshes each having a size or area (ΔA, ΔY), as illustrated in FIG. 8(*a*), and if one of thus divided mesh regions contains at least one piece of detection points data, a value of "1" is stored for that divided region, and if not, a value of "0" is stored. Then, in step 702, ΔA and ΔY indicative of the size or dimensions of each mesh are set. In this embodiment, ΔA=0.25 m and ΔY=2 m.

In subsequent steps 703, 704 and 705, the number (m, n) of each mesh region containing any of all the current detection points data pairs (Ai(0), Yi(0)) is calculated according to the following equations (10) and (11), and "1" is substituted for Image 2 (m, n).

$$m = Ai(0)/\Delta A + N/2 \quad (10)$$

$$n = Yi(0)/\Delta Y \quad (11)$$

The two-dimensional array Image 2 (m, n) thus obtained corresponds to a distance image which is formed by developing the data pairs (Ai(0), Yi(0)) calculated from the detection points data in the coordinate system where the distances A from the lane center are taken on the horizontal axis or the abscissa, and the distance Y are taken on the vertical axis or the ordinate.

Figure 14:
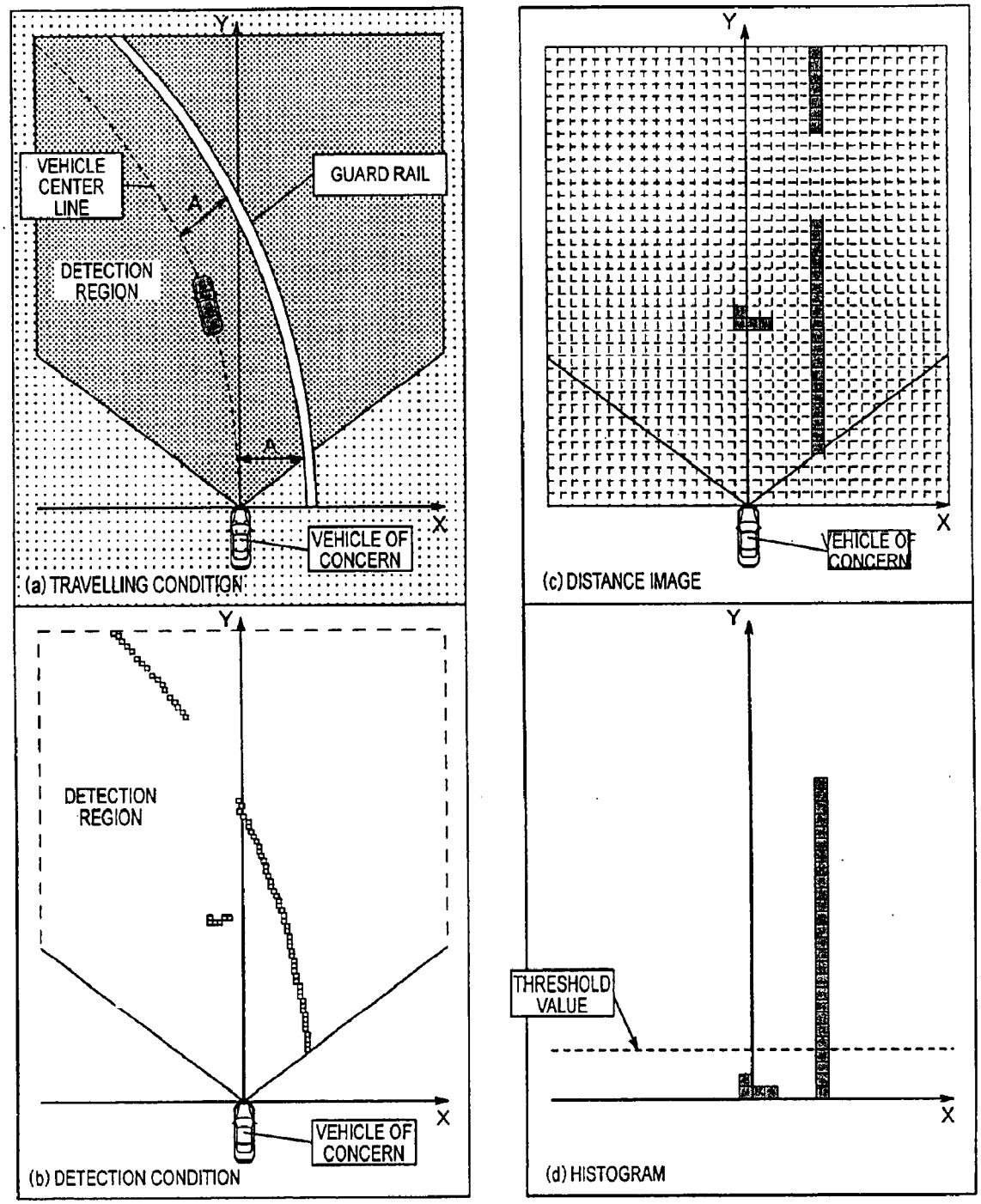
FIG. 14 is a view for explaining the preparation of a histogram in the "curved road detection points determination processing" according to the present invention.

In step 706, the distance image obtained in steps 703 through 705 is projected to the A axis or horizontal axis to form a histogram Aproj(m), as illustrated to FIG. 14. As the histogram is prepared in this manner, when the laser radar 100 is detecting a guardrail on a curved road for instance, a plurality of pieces of detection points data, detecting the guardrail, become a group of detection points arranged in the longitudinal direction (Y), and hence, when seeing the distance image corresponding to the group of detection points in a histogram in which the distance image is projected to the A axis, a peak comes out at a side or lateral position A in which the guardrail exists. Then, in subsequent steps 707 through 711, mesh No. m containing a piece of detection points data is calculated according to equation (10)

for each piece of detection points data, and if the value of Aproj(m) indicated at "m" is equal to or greater than a prescribed value, this piece of detection points data is assumed to be one of the detection points data which are arranged in the curved road, and hence it is determined as curved road detection points data. On the other hand, if the value of Aproj(m) is less than the prescribed value, it is determined that this piece of detection points data is not curved road detection points data.

The "vehicle tracking processing" of step 206 in FIG. 3 will be described below. This processing is to estimate the current position of an object in the form of a preceding vehicle (hereinafter simply referred to as "a recognized vehicle") which was detected at the last time according to a "moving vehicle detection processing" in step 207 to be described later, or according to a "stop vehicle detection processing" in step 208 to be described later, or which has been successfully tracked according to a "vehicle tracking processing" to be explained below, set a window around the estimated position of the recognized vehicle, and calculate the current position of the last recognized vehicle based on the detection points data contained in the window.

Figure 9:
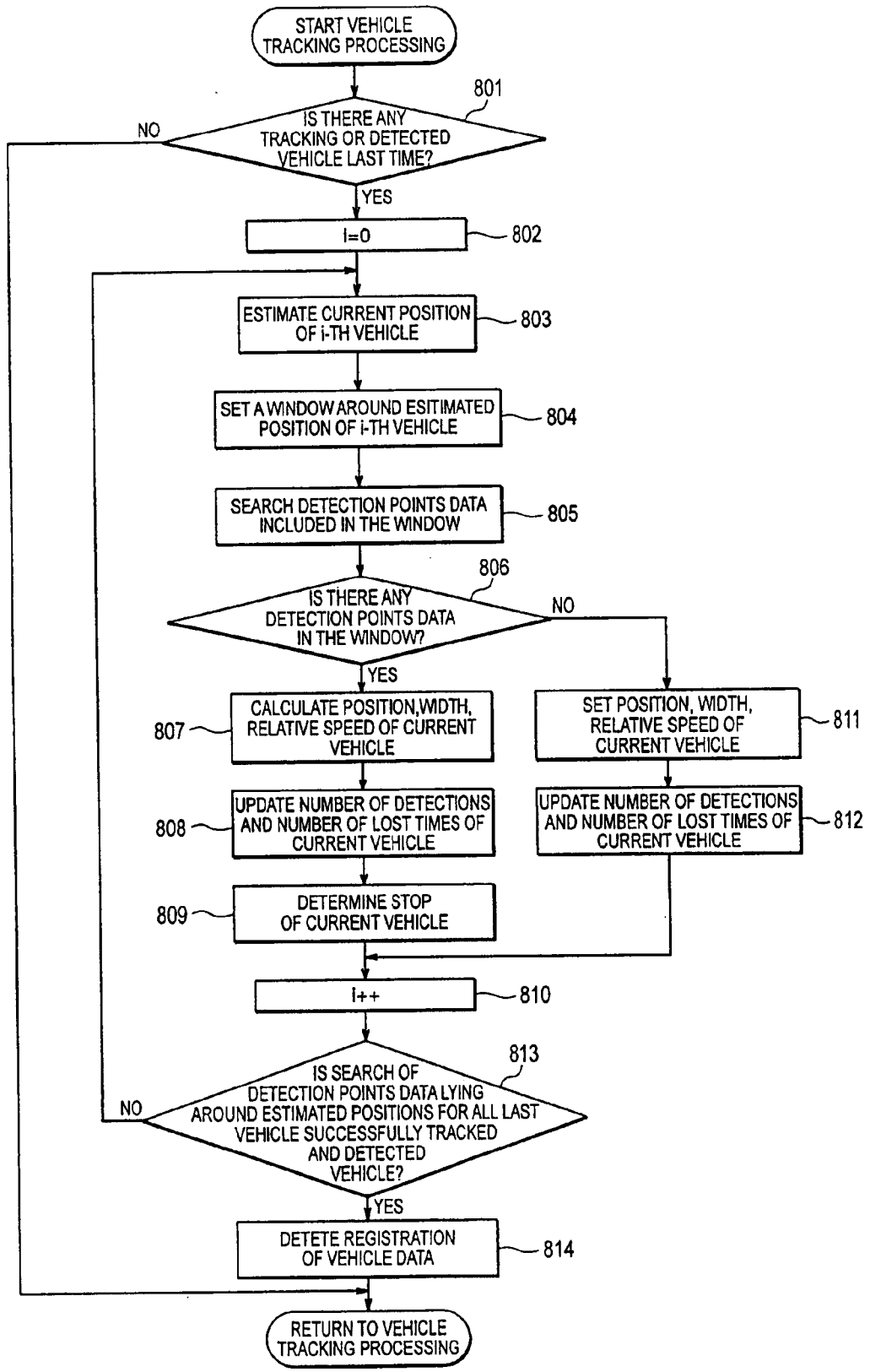
FIG. 9 is a flow chart for explaining the details of the "vehicle tracking processing" according to the present invention.

Reference will now be made to the details of the "vehicle tracking processing" in step 206 by the use of FIG. 9. First, in step 801, it is ascertained whether or not there is the vehicle data which succeeded in detecting a vehicle according to the last "moving vehicle detection processing" or according to the last "stop vehicle detection processing", or in tracking a vehicle according to the last "vehicle tracking processing". When there exists no vehicle which was successfully detected or tracked at the last time, this processing is ended or passed through. On the other hand, when there exists a vehicle which was successfully detected or tracked at the last time, the control process proceeds to step 802 where "i" is set to zero (i.e., i=0), and then to step 803 where the position of the recognized vehicle of No. i (i-th vehicle) to be detected at this time is estimated by the use of the following equations (12) and (13).

$$Xpi = Xvi(1) + Vrxvi(1) \times dT \tag{12}$$

$$Ypi = Yvi(1) + Vryvi(1) \times dT \tag{13}$$

Subsequently, in step 804, a window with a size or dimensions of ΔX=3.5 m and ΔY=4 m is set in the surroundings of the position (estimated position) of the recognized vehicle of No. i (i-th vehicle) estimated according to equations (12) and (13) above. In the following step 805, a search is carried out for what is contained in the set window among the detection points data. Then, in step 806, the number of the pieces of detection points data contained in the set window is ascertained, and in the case where there are a plurality of pieces of detection points data contained in the set window, the control process proceeds to step 807. On the other hand, when there is no no detection points data in the set window at all, the control process proceeds to step 811.

In step 807, the current vehicle position (Xvi(0), Yvi(0)) and the current vehicle width Wvi are calculated according to the following equations (14) and (15) by using the detection points data (Xi(0), Yi(0)) contained the set window. In addition, the relative speed (Vrxvi(0), Vryvi(0)) between the recognized vehicle and the subject vehicle is calculated from the current vehicle position (Xvi(0), Yvi(0)) and the last vehicle position (Xvi(1), Yvi(1)) of the recognized vehicle according to the following equation (16).

$$X_V i(0) = \frac{\sum X_j(0)}{N_{data}} \quad Y_V i(0) = \frac{\sum Y_j(0)}{N_{data}} \tag{14}$$

$$W_V i(0) = \text{Max}(X_j(0)) - \text{Min}(X_j(0)) \tag{15}$$

$$V_{rXV} i(0) = \frac{X_V i(0) - X_V i(1)}{dT} \quad V_{rYV} i(0) = \frac{Y_V i(0) - Y_V i(1)}{dT} \tag{16}$$

In step 808, the number of vehicle detections Ndeti is incremented and the number of vehicle lost times Nlosti is cleared to zero.

In step 809, the speed of the recognized vehicle or preceding vehicle Vp is calculated by adding the speed of the subject vehicle Vs to the relative speed Vryvi(0) calculated in step 807. If the speed of the preceding vehicle Vp is below a prescribed value (e.g., 5 km/h), it is determined that the preceding vehicle is a stopped or stationary vehicle. Thereafter, the control process proceeds to step 810 where "i" is incremented in order to process the next recognized vehicle.

On the other hand, in case where the control process goes from step 806 to step 811 in the absence of current detection points data in the window at all, the estimated position calculated in step 803 is set as the current position (Xvi(0), Yvi(0)) of the recognized vehicle. In addition, as for the relative speed, the the last relative speed (Vrxvi(1), Vryvi(1)) is set as the current relative speed (Vrxvi(0), Vryvi(0)) without any change. Subsequently, in step 812, the number of detections Ndeti is cleared to zero, and the number of lost times Nlosti is incremented with "i" being also incremented, so that the control process proceeds to step 810 to process the next recognized vehicle.

In step 813, it is determined whether the above operations have been done for all the recognized vehicles which were detected or successfully tracked at the last time, and when all the last recognized vehicles have been processed, the control process proceeds to step 814. In step 814, the data registrations of the recognized vehicles of which the number of lost times Nlosti is two or more are deleted, and the "vehicle tracking processing" is ended.

Figure 10:
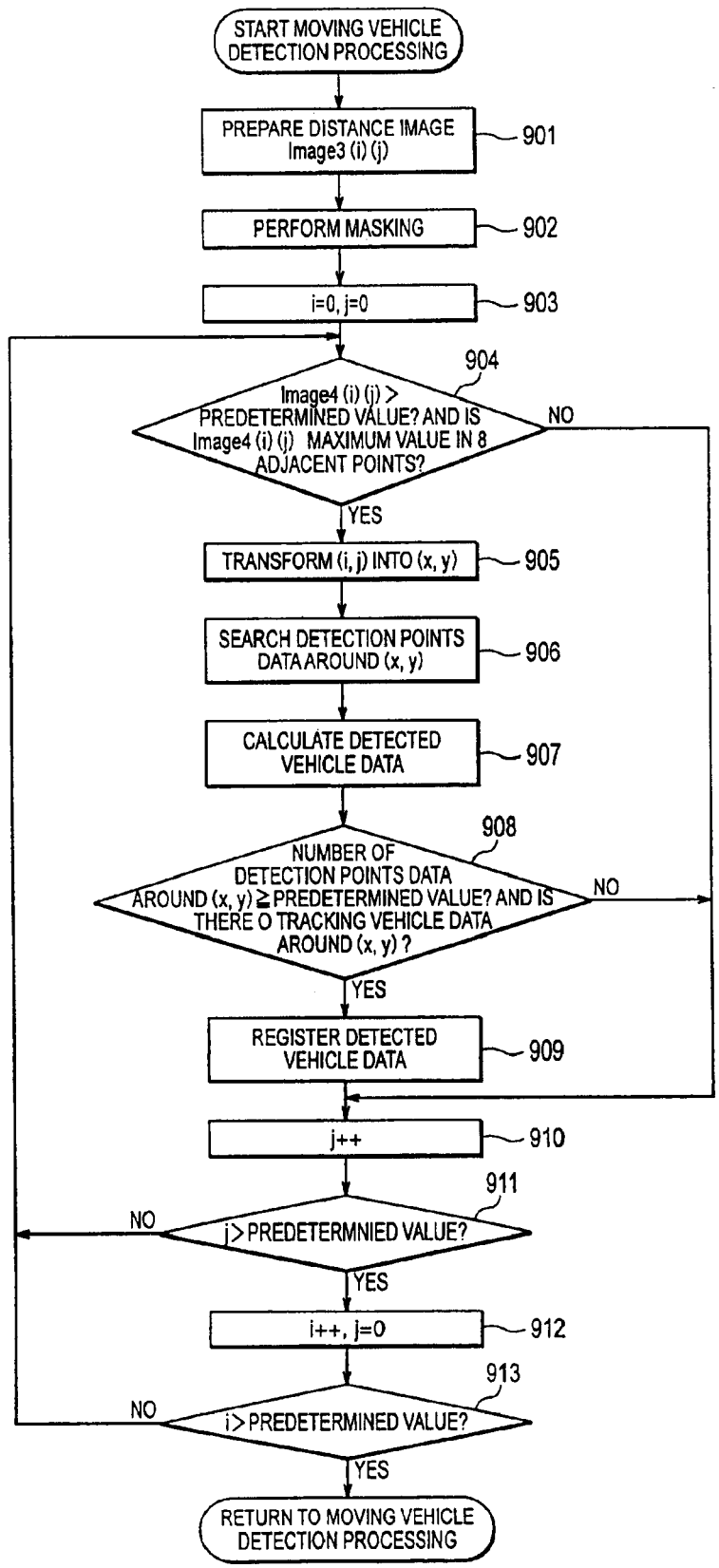
FIG. 10 is a flow chart for explaining the details of the "moving vehicle detection processing" according to the present invention.

Next, reference will be made to the details of the "moving vehicle detection processing" in step 207 by using FIG. 10. First, in step 901, the current detection points data are developed into a two-dimensional array Image 3 (m, n). Specifically, for those of all the current detection points data (Xi(0), Yi(0)) which were determined to be moving detection points data, but not column detection points data and not the curved road detection points data according to the processings in steps 203 through 205, mesh numbers (m, n) corresponding to the respective pieces of detection points data are determined by means of the following equations (17) and (18), and their corresponding Image 3 (m, n) is set to "1". In this embodiment, ΔX is set to 0.25 m, and ΔY is set to 2 m.

$$m = Xi(0)/\Delta X + M/2 \tag{17}$$

$$n = Yi(0)/\Delta Y \tag{18}$$

Figure 15:
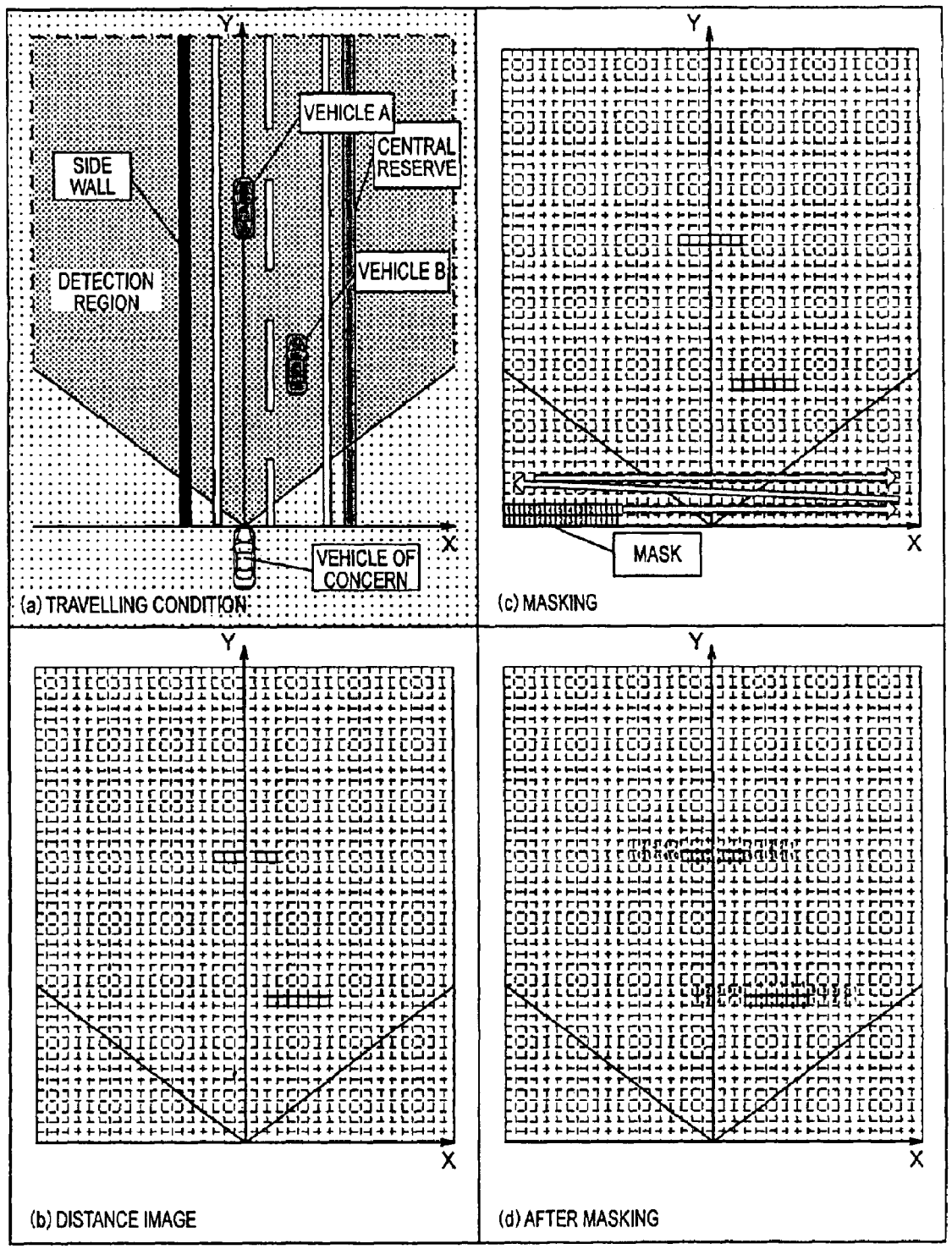
FIG. 15 is a view for explaining a mask processing according to the present invention.

Subsequently, in step 902, a mask processing is performed. The mask processing means that a preset numeric row as expressed by the following equation (19) is scanned for all the elements of the Image 3 formed in step 901, and arithmetic operations of multiplication and summation as expressed by the following equation (20) are carried out, and the results of the arithmetic operations are stored in a two-dimensional array Image 4 (m, n) (see FIG. 15).

$$\text{Mask}(p, q) = \begin{pmatrix} 1 & 1 & 2 & 3 & 4 & 5 & 4 & 3 & 2 & 1 & 1 \\ 1 & 1 & 1 & 2 & 3 & 4 & 3 & 2 & 1 & 1 & 1 \end{pmatrix} \quad (19)$$

$$\text{Image } 4(m, n) = \quad (20)$$
$$\sum_{i=m-5}^{m+5} \sum_{j=m}^{m+1} \text{Image } 3(i, j) \times \text{Mask } (i-m+6, j-n+1)$$

In steps 903 through 913, the roughly estimated position where a vehicle exists is calculated based on the Image 4 (m, n) which was formed in step 902, and a window is set in the surroundings of the roughly estimated position. Then, the detailed or accurate position and width of the vehicle are calculated by using the current detection points data (Xi(0), Yi(0)) contained in the window. More specifically, in step 903, "n" and "m" are both set to zero (n=0 and M=0), and the mesh number to be noted of the Image 4 is initialized, and the control process proceeds to step 904. In step 904, it is determined whether the value of Image 4 (n, m) is greater than a prescribed value and is the greatest among the values of eight meshes which are arranged adjacent to the mesh of concern. When both of these requirements are met, the control process proceeds to step 905, and otherwise, to step 910. The prescribed value is set to a minimum value which will be obtained upon detection of a vehicle. In this embodiment, the prescribed value is set to "4" in consideration of ΔX=0.25 m and in view of the fact that a vehicle in general has a width of at least 1 m or more.

In step 905, the position (Xt, Yt), corresponding to the mesh region of concern, in the coordinate system of the subject vehicle is calculated by the use of the following equations (21) and (22).

$$Xt = (m-M/2) \times \Delta X \quad (21)$$

$$Yt = n \times \Delta Y + \Delta Y/2 \quad (22)$$

In subsequent step 906, a window having a size of ΔXt=±1.25 m and ΔYt=±2 m is set in the surroundings of the position (Xt, Yt) calculated in step 905, and a search is carried out for those of the detection points data contained in the window which were not used for calculating the current position of the recognized vehicle in the "vehicle tracking processing" in step 206. In step 907, the position (Xt, Yt) and the width Wt of a moving vehicle currently detected are calculated according to the following equations (23) and (24) by using the values of the detection points data contained in the set window.

$$Xt = \frac{\sum X_j(0)}{N_{data}} \quad Yt = \frac{\sum Y_j(0)}{N_{data}} \quad (23)$$

$$Wt = \text{Max}(X_j(0)) - \text{Min}(X_j(0)) \quad (24)$$

In step 908, it is determined whether the moving vehicle for which the position and width were calculated in step 907 satisfies the following two requirements i) and ii). When both of the requirements are met, the control process proceeds to step 909 where the moving vehicle is recorded or registered as a detected vehicle, and the position (Xt, Yt) and the width Wt thereof are stored.

i) The number of the pieces of detection points data contained in the set window is greater than a prescribed value.
ii) There is no recognized vehicle already registered in the surroundings (|Xt−Xvi|<a prescribed value and |Yt− Yvi|<a prescribed value) of the position calculated according to equation (23) above.

In steps 910 through 913, the mesh number of the following mesh to be noted is set, and when this processing has been completed for all the meshes, the "moving vehicle detection processing" is ended.

Here, note that the "stop vehicle detection processing" of step 208 in FIG. 3 is different from the "moving vehicle detection processing" of the above-mentioned step 207 only in the following feature. That is, the data to be developed in the coordinate system of the subject vehicle are moving detection points data in the case of the step 901 in the processing of step 207, but in contrast to this, stop detection points data in case of the step 208. However, other than this, both of these processings are the same with each other and hence a detailed description thereof is omitted.

In the "estimation processing for the radius of curvature of a road" of step 209 in FIG. 3, the radius of curvature R(m) of a road is calculated from vehicle data in the form of the speed Vs (m/s) and yaw rate ω (rad/s) of the subject vehicle by using the following equation (25).

$$R = Vs/\omega \quad (25)$$

In the step 210 in FIG. 3, the position, the relative speed and the width of the vehicle calculated in steps 201 through 209 are output to the external device 104.

Figure 16:
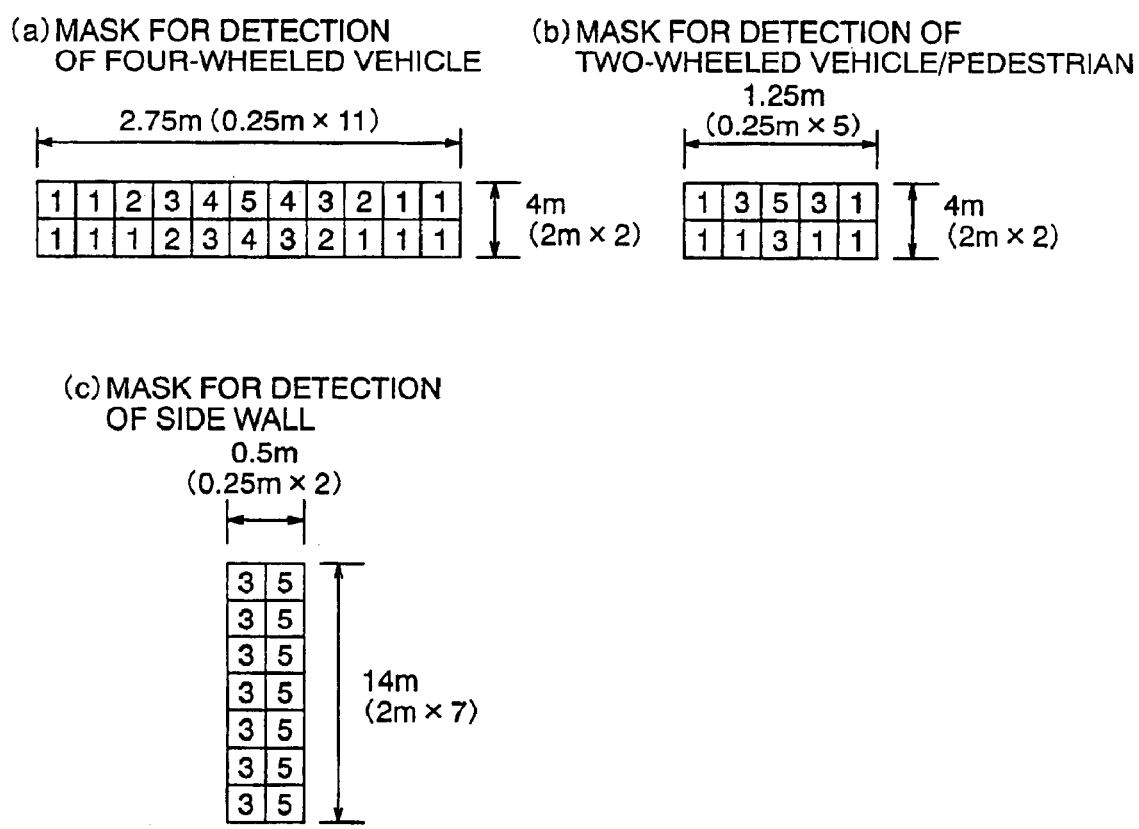
FIG. 16 is a view for illustrating some exemplary masks to detect and track objects other than a four-wheeled vehicle according to the present invention.

Although in the above-mentioned embodiment, a mask as expressed by the equation (19) has been used for detecting and tracking four-wheeled vehicles lying around the subject vehicle, it is possible to detect and track objects other than the four-wheeled vehicles in a similar manner. That is, using other masks as depicted at (a), (b) and (c) in FIG. 16, which are set in accordance with objects to be detected and tracked, and appropriate methods, in place of the equation (20), for performing arithmetic operations of multiplication and summation corresponding to the respective masks, it is possible to detect and track objects other than the four-wheeled vehicle, such as two-wheeled vehicles, side walls, etc., in the same or similar processing. Moreover, if provision is made for a plurality of masks, equations for arithmetic operations of multiplication and summation, and processings corresponding to the respective masks, it will become possible to detect and track a plurality of objects such as, for example, four-wheeled vehicles and two-wheeled vehicles at the same time.

In addition, although the above-described embodiment employs, as a radar, the scanning type laser radar with high sensitivity and a wide viewing angle, the same or similar effects can be achieved with the use of a vehicle-mounted radio wave radar with high angular resolution as described in Japanese Patent Application Laid-Open No. 2000-180540.

As will be clear from the foregoing description, the present invention provides the following remarkable advantages.

According to a first aspect of the present invention, there is provided a vehicle surroundings monitoring apparatus including: a radar for scanningly irradiating electromagnetic waves over a predetermined angular range around a subject vehicle on which the apparatus is mounted, detecting the electromagnetic waves reflected from objects lying around the subject vehicle, and outputting a plurality of directions of scanning irradiation and detected distances from the subject vehicle to the objects in the respective directions of scanning irradiation; and a recognition unit for outputting, based on the detection results of the radar, a relative position and a relative speed, or a rate of change of the relative position, of each of the objects lying around the subject vehicle with respect to the subject vehicle. The recognition unit comprises: a detection points data storage section for storing therein whether or not detection points data in the form of a data pair comprising a direction of scanning irradiation and a detected distance in that direction output by the radar exists in each of M×N small regions into which X, Y coordinates with an X axis being set in a widthwise direction of the subject vehicle and a Y axis being set in a running direction of the subject vehicle are divided, in a two-dimensional array including a plurality of elements corresponding to the small regions, respectively; and an object detection section for performing arithmetic operations of multiplication and summation of the respective elements of the two-dimensional array representative of the presence or absence of the detection points data stored in the detection points data storage section while sequentially scanning a mask of a two-dimensional array comprising J×K (J<N, K<M) elements, and determining, based on the results of the arithmetic operations, attributes such as positions, sizes, etc., of the objects lying around the subject vehicle. With this arrangement, unlike the aforementioned conventional apparatuses in which a plurality of detection points are integrated to merge with each other so as to reconstruct an object gradually or in a stepwise manner, the positions of objects are detected directly from detection points data based on the results of arithmetic operations of multiplication and summation with the use of a mask(s), whereby it is possible to detect the objects with a minimum amount of arithmetic operations or calculations in an efficient manner even with an increased number of detection points resulting from an increased viewing angle and increased sensitivity of the radar as when using a scanning type laser radar. In addition, the arithmetic operations of multiplication and summation by the use of with the mask(s) become a constant amount of processing or calculations irrespective of variations in the number of detection points, so in comparison with the conventional apparatuses, the required amount of processing or operations can be estimated with ease, thus making it possible to design an apparatus with optimal resources.

Further, preferably, the detection points data storage section comprises: a stop detection points determiner for determining, by the use of information about the subject vehicle, whether each of the detection points data is a piece of stop detection points data representative of the data of a stop or stationary object detected, or a piece of moving points detection data representative of an object other than the stationary object, i.e., a moving object; a stop detection points data storage section for storing, based on the results of determination of the stop detection points determiner, the presence or absence of stop detection points data in each of M×N small regions into which X, Y coordinates with an X axis being set in a widthwise direction of the subject vehicle and a Y axis being set in a running direction of the subject vehicle are divided, in a two-dimensional array comprising a plurality of elements corresponding to the small regions, respectively; and a moving detection points data storage section for storing, based on the results of determination of the stop detection points determiner, the presence or absence of moving detection points data in each of the M×N small regions into which X, Y coordinates with an X axis being set in a widthwise direction of the subject vehicle and a Y axis being set in a running direction of the subject vehicle are divided, in a two-dimensional array comprising a plurality of elements corresponding to the small regions, respectively.

The object detection section comprises: a stationary object detector for performing arithmetic operations of multiplication and summation of the respective elements of the two-dimensional array representative of the presence or absence of the stop detection points data stored in the stop detection points data storage section while sequentially scanning a mask of a two-dimensional array comprising J×K (J<N, K<M) elements, and determining, based on the results of the arithmetic operations, attributes such as positions, sizes, etc., of stationary objects lying around the subject vehicle; and a moving object detector for performing arithmetic operations of multiplication and summation of the respective elements of the two-dimensional array representative of the presence or absence of the moving detection points data stored in the moving detection points data storage section while sequentially scanning a mask of a two-dimensional array comprising J×K (J<N, K<M) elements, and determining, based on the results of the arithmetic operations, attributes such as positions, sizes, etc., of moving objects lying around the subject vehicle. With the above arrangement, the detection points data storage section determines, prior to the detection of objects, whether each piece of detection points data is a stop or stationary detection point, and detects, based on the result of the determination, the objects while dividing the detection points into stop detection points and moving detection points, respectively. Thus, the stop detection points and the moving detection points are prevented from being mistakenly determined as a single object, thereby making it possible to improve the accuracy in detection of the object detector.

In addition, preferably, the recognition section further comprises a column detection points determiner for determining whether the respective detection points data are column detection points data representative of data arranged in the running direction of the subject vehicle, and the detection points data storage section, or the stop detection points data storage section or the moving detection points data storage section does not use the column detection points data in its processing. Thus, the recognition unit determines, prior to the detection of objects, whether each piece of detection points data is a longitudinally arranged detection point (column detection point), so that the column detection points are not used for object detection. As a result, road structures such as guardrails, side walls, etc., can be prevented from being mistakenly detected as a single object with a vehicle or an obstacle, thus improving the detection accuracy in the object detector. Besides, even when a side surface and a rear surface of a vehicle which is running on an adjacent lane are detected at the same time, the distance to that vehicle can be determined based solely on the detection points data detecting the rear surface, thus making it possible to improve the positional accuracy in the object detection.

Furthermore, preferably, the recognition unit further comprises a curved road detection points determiner for determining whether the respective detection points data are curved road detection points data representative of data arranged along a curved road, and the detection points data storage section, or the stop detection points data storage section or the moving detection points data storage section does not use the curved road detection points data in its processing. Thus, the recognition unit determines, prior to the detection of objects, whether each piece of detection points data is a detection point arranged along a curved road (curved road detection point), so that the curved road detection points are not used for object detection. Consequently, road structures such as guardrails, side walls, etc., can be prevented from being mistakenly detected as a single object with a vehicle or an obstacle, thus improving the detection accuracy in the object detector.

Moreover, according to a second aspect of the present invention, there is provided a vehicle surroundings monitoring apparatus comprising: a radar for scanningly irradiating electromagnetic waves over a predetermined angular range around a subject vehicle on which the apparatus is mounted, detecting the electromagnetic waves reflected from objects lying around the subject vehicle, and outputting detected distances from the subject vehicle to the objects lying around the subject vehicle and directions of the objects from the subject vehicle; and a recognition unit for outputting, based on the detection results of the radar, a relative position and a relative speed, or a rate of change of the relative position, of each of the objects lying around the subject vehicle with respect to the subject vehicle. The recognition unit comprises: an object detection section for detecting positions of the objects by using detection points data obtained by the radar, and calculating object positional data representative of the positional data of the objects; an object position estimator for estimating a position of each object detected in the past which should currently be detected, based on the past positional data of that object; a window setter for setting a prescribed window in such a manner as to surround the estimated position of each object output by the object position estimator; and an object tracker for determining the current positional data of an object by using the detection points data contained in the window set by the window setter, and calculating a relative speed of that object to the subject vehicle by using the positional data of that object detected in the past. With this arrangement, the vehicle surroundings monitoring apparatus can achieve the tracking of objects with very simple processing by determining the current position of an object corresponding to a past object previously detected or tracked by the use of the detection points data contained in a window set around an estimated position of the past object without judging the conditions of a lot of complicated combinations of the detection points data. As a consequence, even if the number of detection points is increased owing to the widening of a viewing angle and an increased sensitivity of the radar, it is possible to track objects in an efficient manner. Additionally, it is not necessary to take into consideration many combinations of the detection points data as in the conventional apparatuses, thus making it easy to estimate the amount of required processing.

Further, preferably, the recognition unit further comprises a stop detection points determiner for determining, by the use of information about the subject vehicle, whether each of the detection points data is a piece of stop detection points data representative of the data of a stopped object detected, or a piece of moving points detection data representative of an object other than a stopped object, and the object tracker calculates, based on the determination results of the stop detection points determiner, a current positional data of an object, by using the stop detection points data contained in the window set by the window setter when a difference between a relative speed of that object with respect to the subject vehicle detected in the past and a speed of the subject vehicle detected in the past is less than a prescribed value, but by using the moving detection points data contained in the set window when a difference between a relative speed of that object with respect to the subject vehicle and a speed of the subject vehicle both detected in the past is equal to or greater than the prescribed value, and the object tracker also calculates a current relative speed of that object with respect to the subject vehicle by using the current and past positional data of that object. Accordingly, the recognition unit determines, prior to the tracking of objects, whether or not each piece of detection points data is a stop or stationary detection point, and tracks, based on the result of the determination, the objects while dividing the detection points data into stop detection points and moving detection points, respectively. Thus, the stop detection points and the moving detection points are prevented from being mistakenly determined as the same points on a time series, thereby making it possible to improve the accuracy in tracking of the object tracker.

Furthermore, preferably, the object detection section does not use the detection points data which were used to calculate the object positional data in the current processing of the object tracker. Consequently, it becomes possible to prevent plural objects from being detected in the vicinity of the current position of the object determined by the object tracker.

In addition, preferably, the recognition section further comprises a column detection points determiner for determining whether the respective detection points data are column detection points data representative of data arranged in the running direction of the subject vehicle, and the object tracker does not use the column detection points data in its processing based on the detection results of the column detection points determiner. Accordingly, the recognition unit determines, prior to the tracking of objects, whether each piece of detection points data is a longitudinally arranged detection point (column detection point), and does not use the column detection points for object tracking, so that road structures such as guardrails, side walls, etc., can be prevented from being mistakenly tracked as a single object with a vehicle or an obstacle, thus improving the tracking accuracy in the object tracker. Besides, even when a side surface and a rear surface of a vehicle which is running on an adjacent lane are detected at the same time, the distance to that vehicle can be determined based solely on the detection points data detecting the rear surface, thus making it possible to improve the positional accuracy in the object tracking.

Further, preferably, the recognition unit further comprises a curved road detection points determiner for determining whether the respective detection points data are curved road detection points data representative of data arranged along a curved road, and the object tracker does not use the curved road detection points data in its processing based on the detection results of the curved road detection points determiner. Thus, the recognition unit determines, prior to the tracking of objects, whether each piece of detection points data is a detection point arranged along a curved road or road curve (curved road detection point), and does not use the curved road detection points for object tracking, so that road structures such as guardrails, side walls, etc., can be prevented from being mistakenly tracked as a single object with a vehicle or an obstacle, thus improving the positional accuracy in the object tracking.

What is claimed is:

1. A vehicle surroundings monitoring apparatus comprising:

a radar for scanningly irradiating electromagnetic waves over a predetermined angular range around a subject vehicle on which said apparatus is mounted, detecting the electromagnetic waves reflected from objects lying around said subject vehicle, and outputting detected distances from said subject vehicle to said objects lying around said subject vehicle and directions of said objects from said subject vehicle; and a recognition unit for outputting, based on the detection results of said radar, a relative position and a relative speed, or a rate of change of the relative position, of each of said objects lying around said subject vehicle with respect to said subject vehicle;

said recognition unit comprising:

an object detection section for detecting positions of said objects by using detection points data obtained by said radar, and calculating object positional data representative of the positional data of said objects;

an object position estimator for estimating a position of each object detected in the past which should currently be detected, based on the past positional data of that object;

a window setter for setting a prescribed window in such a manner as to surround the estimated position of each object output by said object position estimator; and an object tracker for determining the current positional data of an object by using the detection points data contained in the window set by said window setter, and calculating a relative speed of that object to said subject vehicle by using the positional data of that object detected in the past;

wherein said recognition unit further comprises a stop detection points determiner for determining, by the use of information about said subject vehicle, whether each of the detection points data is stop detection points data representative of the data of a detected stopped object, or moving points detection data representative of an object other than a stopped object, and wherein said object tracker calculates, based on the determination results of said stop detection points determiner, a current positional data of an object, by (1): using the stop detection points data contained in the window set by said window setter when a difference between a relative speed of that object with respect to said subject vehicle detected in the past and a speed of said subject vehicle detected in the past is less than a prescribed value or, by (2): using the moving detection points data contained in the set window when a difference between a relative speed of that object with respect to said subject vehicle and a speed of said subject vehicle both detected in the past is equal to or greater than the prescribed value, and said object tracker also calculates a current relative speed of that object with respect to said subject vehicle by using the current and past positional data of that object.

2. The vehicle surroundings monitoring apparatus according to claim 1, wherein said object detection section does not use the detection points data which were used to calculate the object positional data in the current processing of said object tracker.

3. The vehicle surroundings monitoring apparatus according to claim 1, wherein said recognition section further comprises a column detection points determiner for determining whether the respective detection points data are column detection points data representative of data arranged in the running direction of said subject vehicle, and wherein said object tracker does not use the column detection points data in its processing based on the detection results of said column detection points determiner.

4. The vehicle surroundings monitoring apparatus according to claim 1, wherein said recognition unit further comprises a curved road detection points determiner for determining whether the respective detection points data are curved road detection points data representative of data arranged along a curved road, and wherein said object tracker does not use the curved road detection points data in its processing based on the detection results of said curved road detection points determiner.

* * * * *